(12) United States Patent
Kay et al.

(10) Patent No.: US 10,240,257 B2
(45) Date of Patent: Mar. 26, 2019

(54) SYSTEMS AND METHODS FOR CONTROLLED LAYDOWN OF MATERIALS IN A FIBER PRODUCTION SYSTEM

(71) Applicant: CLARCOR Inc., Franklin, TN (US)

(72) Inventors: Stephen Kay, Austin, TX (US); Simon Padron Rosas, Edinburg, TX (US); Thomas Daniel Carr, Austin, TX (US)

(73) Assignee: CLARCOR Inc., Franklin, TN (US)

( * ) Notice: Subject to any disclaimer, the term of this patent is extended or adjusted under 35 U.S.C. 154(b) by 624 days.

(21) Appl. No.: 14/854,452

(22) Filed: Sep. 15, 2015

(65) Prior Publication Data

US 2016/0138194 A1    May 19, 2016

Related U.S. Application Data

(60) Provisional application No. 62/050,384, filed on Sep. 15, 2014.

(51) Int. Cl.
| | | |
|---|---|---|
| *D01D 5/00* | (2006.01) | |
| *D01D 5/18* | (2006.01) | |
| *D01D 7/00* | (2006.01) | |
| *B29C 47/00* | (2006.01) | |

(52) U.S. Cl.
CPC ............. *D01D 7/00* (2013.01); *D01D 5/0076* (2013.01); *D01D 5/18* (2013.01); *B29C 47/0076* (2013.01)

(58) Field of Classification Search
CPC .......... D01D 7/00; D01D 5/18; D01D 5/0076; B29C 47/0076
See application file for complete search history.

(56) References Cited

U.S. PATENT DOCUMENTS

| | | | | |
|---|---|---|---|---|
| 3,032,836 A | * | 5/1962 | Anderberg | D01G 25/00 19/300 |
| 3,364,538 A | * | 1/1968 | Murphy | D04H 3/16 19/299 |
| 3,748,693 A | * | 7/1973 | Jespersen | D01G 25/00 19/306 |
| 3,865,566 A | * | 2/1975 | Kleist | D04H 3/03 65/461 |
| 3,886,629 A | * | 6/1975 | Nakai | C09B 1/542 19/82 |
| 4,004,324 A | * | 1/1977 | Bridge | B27N 3/14 425/82.1 |
| 4,662,032 A | * | 5/1987 | Thorbjornsson | D21H 27/00 19/300 |
| 6,338,814 B1 | * | 1/2002 | Hills | D01D 5/098 156/148 |
| 6,363,580 B1 | * | 4/2002 | Sorensen | B27N 3/14 19/296 |
| 6,402,492 B1 | * | 6/2002 | Achterwinter | D04H 3/005 425/378.2 |
| 6,499,982 B2 | * | 12/2002 | Allen | D04H 3/02 425/73 |

(Continued)

*Primary Examiner* — Jeffrey M Wollschlager
(74) *Attorney, Agent, or Firm* — Reinhart Boerner Van Deuren P.C.

(57) ABSTRACT

Described herein are apparatuses and methods of creating fibers, such as microfibers and nanofibers. The methods discussed herein employ centrifugal forces to transform material into fibers. Apparatuses that may be used to create fibers are also described. To improve the collection of fibers, various devices and systems for controlling the deposition pattern of the produced fibers are described.

27 Claims, 15 Drawing Sheets

(56) References Cited

U.S. PATENT DOCUMENTS

| | | | | |
|---|---|---|---|---|
| 6,799,957 B2* | 10/2004 | Allen | .................... | D01D 5/0985 425/66 |
| 7,004,738 B2* | 2/2006 | Becker | .................. | D01D 5/0985 156/441 |
| 8,475,692 B2* | 7/2013 | Sumida | ................ | D01D 5/0061 264/10 |
| 9,365,951 B2* | 6/2016 | Lamanac | .................. | D01D 5/18 |
| 2006/0012084 A1* | 1/2006 | Armantrout | ......... | D01D 5/0985 264/465 |
| 2011/0014542 A1* | 1/2011 | Sumida | ................ | D01D 5/0061 429/480 |
| 2011/0059261 A1* | 3/2011 | Sumida | ................ | D01D 5/0061 427/459 |
| 2011/0156319 A1* | 6/2011 | Kurokawa | ............ | D01D 5/0061 264/466 |
| 2012/0292795 A1* | 11/2012 | Peno | ........................ | D01D 5/18 264/8 |
| 2012/0295021 A1* | 11/2012 | Peno | ........................ | D01D 5/18 427/180 |
| 2012/0304613 A1* | 12/2012 | Peno | ........................ | D01D 5/18 57/90 |
| 2013/0099409 A1* | 4/2013 | Schutt | ...................... | D04H 3/03 264/115 |
| 2014/0057011 A1* | 2/2014 | Schutt | ...................... | D04H 1/56 425/405.1 |
| 2016/0047061 A1* | 2/2016 | Huang | .................. | D04H 1/732 264/468 |
| 2016/0047062 A1* | 2/2016 | Greenawalt | .......... | D01D 5/0069 264/465 |
| 2016/0168756 A1* | 6/2016 | Gladish | ................ | D04H 1/4382 428/221 |

\* cited by examiner

US 10,240,257 B2

SYSTEMS AND METHODS FOR CONTROLLED LAYDOWN OF MATERIALS IN A FIBER PRODUCTION SYSTEM

PRIORITY CLAIM

This application claims the benefit of U.S. Provisional Application No. 62/050,384, entitled "SYSTEMS AND METHODS FOR CONTROLLED LAYDOWN OF MATERIALS IN A FIBER PRODUCTION SYSTEM", filed on Sep. 15, 2015, which is incorporated herein by reference.

BACKGROUND OF THE INVENTION

1. Field of the Invention

The present invention generally relates to the field of fiber production. More specifically, the invention relates to fibers of micron and sub-micron size diameters.

2. Description of the Relevant Art

Fibers having small diameters (e.g., micrometer ("micron") to nanometer ("nano")) are useful in a variety of fields from the clothing industry to military applications. For example, in the biomedical field, there is a strong interest in developing structures based on nanofibers that provide scaffolding for tissue growth to effectively support living cells. In the textile field, there is a strong interest in nanofibers because the nanofibers have a high surface area per unit mass that provide light, but highly wear resistant, garments. As a class, carbon nanofibers are being used, for example, in reinforced composites, in heat management, and in reinforcement of elastomers. Many potential applications for small-diameter fibers are being developed as the ability to manufacture and control their chemical and physical properties improves.

It is well known in fiber manufacturing to produce extremely fine fibrous materials of organic fibers, such as described in U.S. Pat. Nos. 4,043,331 and 4,044,404, where a fibrillar mat product is prepared by electrostatically spinning an organic material and subsequently collecting spun fibers on a suitable surface; U.S. Pat. No. 4,266,918, where a controlled pressure is applied to a molten polymer which is emitted through an opening of an energy charged plate; and U.S. Pat. No. 4,323,525, where a water soluble polymer is fed by a series of spaced syringes into an electric field including an energy charged metal mandrel having an aluminum foil wrapper there around which may be coated with a PTFE (Teflon™) release agent. Attention is further directed to U.S. Pat. Nos. 4,044,404, 4,639,390, 4,657,743, 4,842,505, 5,522,879, 6,106,913 and 6,111,590—all of which feature polymer nanofiber production arrangements.

Electrospinning is a major manufacturing method to make nanofibers. Examples of methods and machinery used for electrospinning can be found, for example, in the following U.S. Pat. Nos. 6,616,435; 6,713,011; 7,083,854; and 7,134,857. In general, electro-spinning is limited mainly due to its low production rate. In many respects centrifugal spinning methods do not suffer the same disadvantages and limitations of electro-spinning techniques.

Centrifugal spinning uses one or more rotating spinnerets to produce nanofibers. Spinning fluid is placed in the rotating spinneret, as either a melt or a solution. The rotation rate of the spinneret is sufficiently high so that centrifugal force overcomes surface tension of the spinning fluid, and a liquid jet is ejected from a nozzle in the spinneret. The jet undergoes a stretching process and forms nanofibers as the jet solidifies. The nanofibers are deposited on a collector such as a substrate disposed below the spinnerets.

SUMMARY OF THE INVENTION

In an embodiment, a microfiber and/or nanofiber producing system includes: a fiber producing device comprising a body, the body comprising a plurality of openings and a coupling member, wherein the body is configured to receive material to be produced into a fiber; a driver capable of rotating the body, wherein the body is couplable to the driver through the coupling member; and a deposition system that directs fibers produced by the fiber producing device toward a substrate disposed below the fiber producing device during use. In an embodiment, the deposition system includes: an airflow system that draws air through the substrate such that fibers produced by the fiber producing device are drawn toward the substrate; and an airflow control system configured to adjust an airflow rate through one or more regions of the substrate. During use rotation of the body coupled to the driver causes material in the body to be ejected through one or more openings to produce microfibers and/or nanofibers that are at least partially transferred to the substrate by the deposition system.

In an embodiment, the deposition system includes a substrate support with the airflow system incorporated into the substrate support. The airflow control system may include a plurality of adjustable louvers incorporated into the substrate support. Each of the plurality of adjustable louvers may be arranged in a louver chamber which is substantially isolated from the other louver chambers. Furthermore, each of the plurality of adjustable louvers may be individually controlled by a plurality of control devices coupled to the adjustable louvers. The adjustable louvers are individually positionable in at least a fully open, a partially open, or a fully closed position.

The fiber producing system may also include a substrate transfer system, wherein the substrate transfer system moves a continuous sheet of substrate material through the deposition system. The fiber producing system may also include a heating device thermally coupled to the fiber producing device. The fiber producing device may also be enclosed in a chamber, wherein the environment inside the chamber is controllable.

In an embodiment, the substrate is a substantially continuous sheet, and the method includes moving the substrate below the fiber producing device while fibers are being produced by the fiber producing device. The fibers may be formed without subjecting the material to an externally-applied electric field that is sufficient to draw a fiber from the openings of the fiber producing device.

In an embodiment, a microfiber and/or nanofiber producing system includes: a fiber producing device comprising a body, the body comprising a plurality of openings and a coupling member, wherein the body is configured to receive material to be produced into a fiber; a driver capable of rotating the body, wherein the body is couplable to the driver through the coupling member; and a deposition system that directs fibers produced by the fiber producing device toward a substrate disposed below the fiber producing device during use. The deposition system includes: a plurality of static plates positionable under the substrate; and an electric field control system coupled to one or more of the static plates, wherein the electric field control system independently alters the electric field of each of the coupled static plates such that the electrostatic plates have an opposite charge to a charge of the fibers produced by the fiber producing device, wherein the produced fibers are drawn toward the substrate due to an electrostatic attraction to the electrostatic plate. During use, rotation of the body coupled to the driver causes material in the body to be ejected through one or more openings to produce microfibers and/or nanofibers that are at least partially transferred to the substrate by the deposition system.

In an embodiment, the electric field control system comprises one or more elevator mechanisms coupled to the static plates, wherein the elevator mechanisms are capable of independently positioning the static plates nearer or farther from the substrate during use. In an alternate embodiment, the electric field control system comprises one or more variable voltage sources coupled to one or more of the static plates, wherein the electric field control system uses the variable voltage sources to independently alter the electric field of each of the coupled static plates.

In an embodiment, the deposition system further comprises a substrate support, wherein the plurality of static plates is incorporated into the substrate support. The static plates may be electrically isolated from the other static plates.

The fiber producing system may also include a substrate transfer system, wherein the substrate transfer system moves a continuous sheet of substrate material through the deposition system. The fiber producing system may also include a heating device thermally coupled to the fiber producing device. The fiber producing device may also be enclosed in a chamber, wherein the environment inside the chamber is controllable.

In an embodiment, a method of producing microfibers and/or nanofibers, includes: placing material into a fiber producing device, the fiber producing device comprising a body comprising one or more openings and a coupling member, wherein the body is configured to receive material to be produced into a fiber; rotating the fiber producing device at a speed of at least about 1000 rpm, wherein rotation of the fiber producing device causes material in the body to be ejected through one or more openings to produce microfibers and/or nanofibers; and directing fibers produced by the fiber producing device toward a substrate disposed below the fiber producing device using a deposition system as described above.

BRIEF DESCRIPTION OF THE DRAWINGS

Advantages of the present invention will become apparent to those skilled in the art with the benefit of the following detailed description of embodiments and upon reference to the accompanying drawings.

Figure 1:
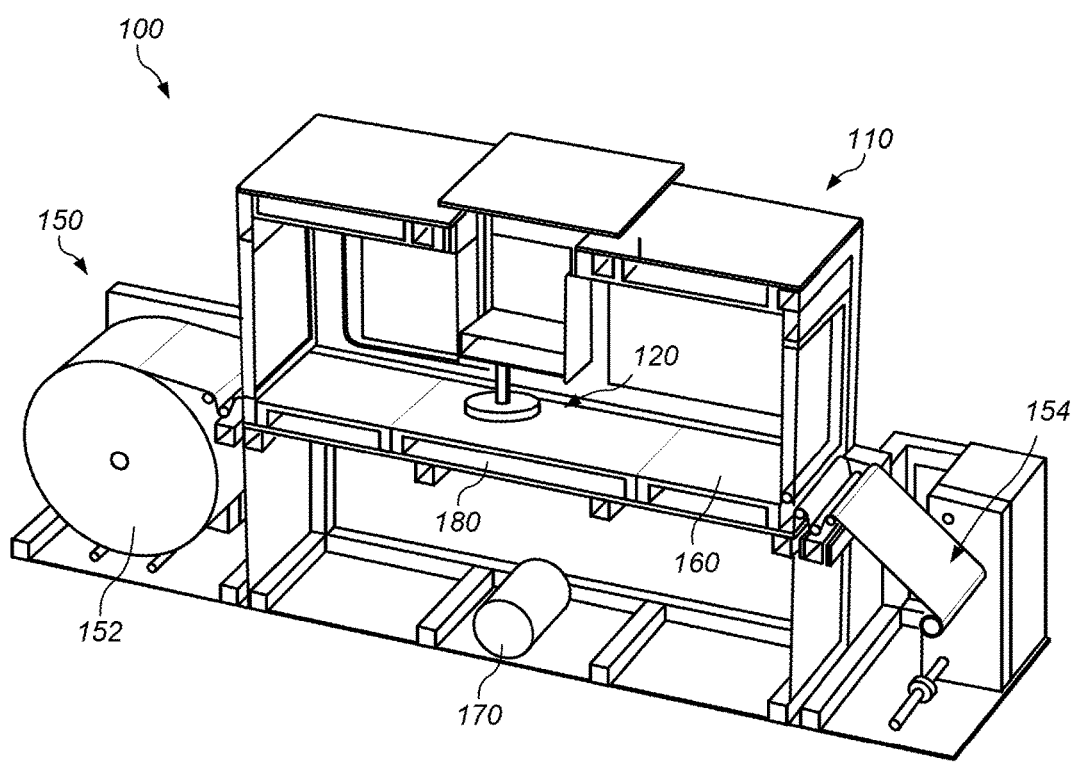
FIG. 1 depicts a fiber deposition system.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a method or apparatus that "comprises," "has," "includes" or "contains" one or more steps or elements possesses those one or more steps or elements, but is not limited to possessing only those one or more steps or elements. Likewise, an element of an apparatus that "comprises," "has," "includes" or "contains" one or more features possesses those one or more features, but is not limited to possessing only those one or more features.

Described herein are apparatuses and methods of creating fibers, such as microfibers and nanofibers. The methods discussed herein employ centrifugal forces to transform material into fibers. Apparatuses that may be used to create fibers are also described. Some details regarding creating fibers using centrifugal forces may be found in the following U.S. Patent Application Publication Nos: 2009/0280325 entitled "Methods and Apparatuses for Making Superfine Fibers" to Lozano et al.; 2009/0280207 entitled "Superfine Fiber Creating Spinneret and Uses Thereof" to Lozano et al.; 2014/0042651 entitled "Systems and Methods of Heating a Fiber Producing Device" to Kay et al.; 20140159262 entitled "Devices and Methods for the Production of Microfibers and Nanofibers in a Controlled Environment" to Kay et al. 2014/0035179 entitled "Devices and Methods for the Production of Microfibers and Nanofibers" and U.S. Pat. No. 8,721,319 entitled "Superfine Fiber Creating Spinneret and Uses Thereof" to Lozano et al.; U.S. Pat. No. 8,231,378 entitled "Superfine Fiber Creating Spinneret and Uses Thereof" to Lozano et al.; U.S. Pat. No. 8,647,540 entitled "Apparatuses Having Outlet Elements and Methods for the Production of Microfibers and Nanofibers" to Peno; U.S. Pat. No. 8,777,599 entitled "Multilayer Apparatuses and Methods for the Production of Microfibers and Nanofibers" to Peno et al.; U.S. Pat. No. 8,658,067 entitled "Apparatuses and Methods for the Deposition of Microfibers and Nanofibers on a Substrate" to Peno et al.; U.S. Pat. No. 8,647,541 entitled "Apparatuses and Methods for Simultaneous Production of Microfibers and Nanofibers" to Peno et al.; U.S. Pat. No. 8,778,240 entitled "Split Fiber Producing Devices and Methods for the Production of Microfibers and Nanofibers" to Peno et al.; and U.S. Pat. No. 8,709,309 entitled "Devices and Methods for the Production of Coaxial Microfibers and Nanofibers" to Peno et al.; all of which are incorporated herein by reference.

An embodiment of a system 100 for depositing fibers onto a substrate is depicted in FIG. 1. System 100 includes a fiber producing system 110 and a substrate transfer system 150. Fiber producing system 110 includes a fiber producing device 120, as described herein. Fiber producing system produces and directs fibers produced by a fiber producing device toward a substrate 160 disposed below the fiber producing device during use. Substrate transfer system moves a continuous sheet of substrate material through the deposition system.

Figure 2:
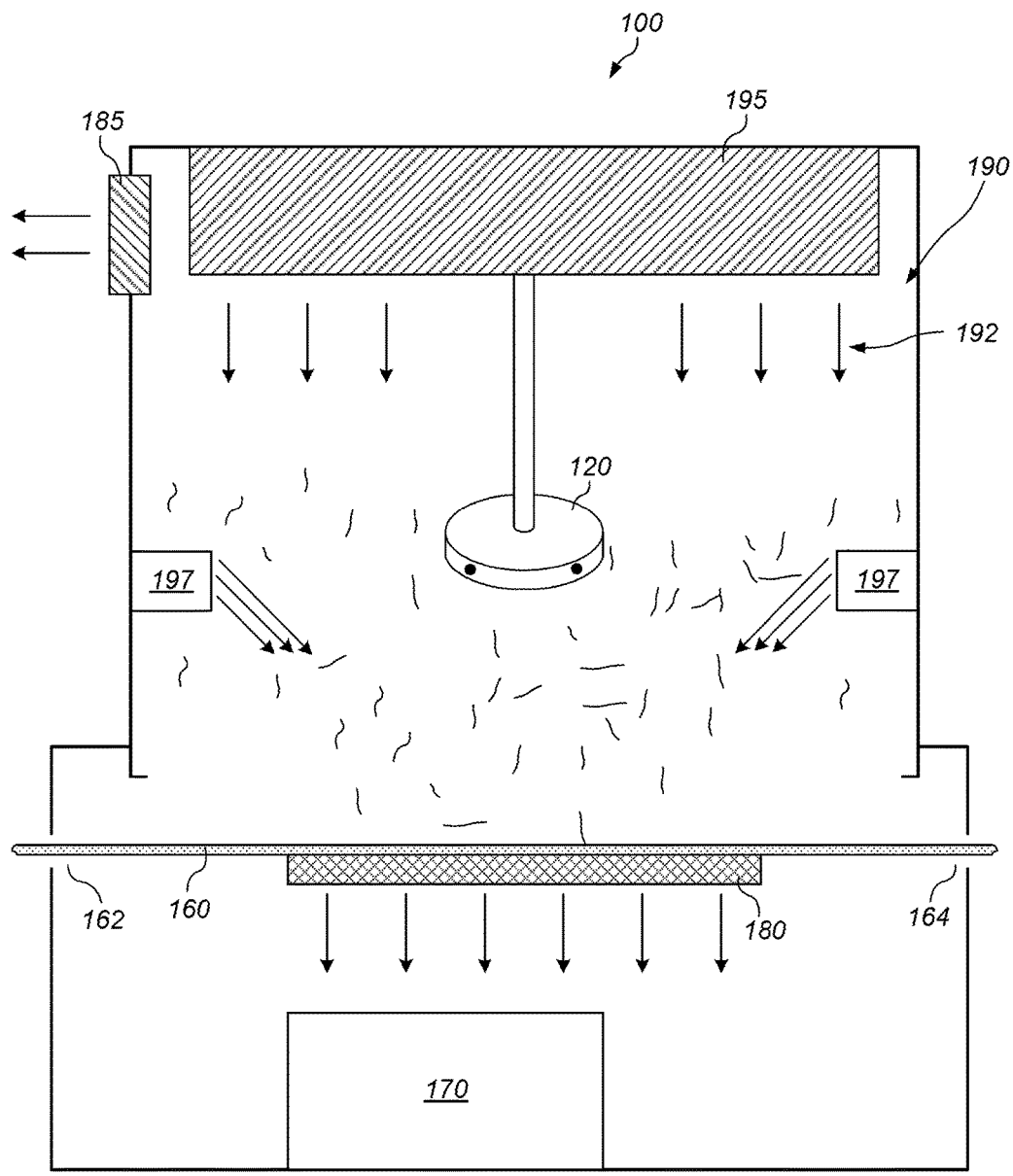
FIG. 2 depicts a schematic diagram of a fiber deposition system in use.

System 100, in one embodiment, includes a top mounted fiber producing device 120. During use, fibers produced by fiber producing device 120 are deposited onto substrate 160. A schematic diagram of system 100 is depicted in FIG. 2. Fiber producing system 110 may include one or more of: a vacuum system 170, an electrostatic plate 180, and a gas flow system 190. A vacuum system produces a region of reduced pressure under substrate 160 such that fibers produced by fiber producing device 110 are drawn toward the substrate due to the reduced pressure. Alternatively, one or more fans may be positioned under the substrate to create an air flow through the substrate. Gas flow system 190 produces a gas flow 192 that directs fibers formed by the fiber producing device toward the substrate. Gas flow system may be a pressurized air source or one or more fans that produce a flow of air (or other gases). The combination of vacuum and air flow systems are used to produce a "balanced air flow" from the top of the deposition chamber through the substrate to the exhaust system by using forced air (fans, pressurized air) and exhaust air (fans, to create an outward flow) and balancing and directing the airflow to produce a fiber deposition field down to the substrate. System 100 includes substrate inlet 162 and substrate outlet 164.

An electrostatic plate 180 is also positioned below substrate 160. The electrostatic plate is a plate capable of being charged to a predetermined polarity. Typically, fibers produced by the fiber producing device have a net charge. The net charge of the fibers may be positive or negative, depending on the type of material used. To improve deposition of charged fibers, electrostatic plate 180 may be disposed below substrate 160 and be charged to an opposite polarity as the produced fibers. In this manner, the fibers are attracted to the electrostatic plate due to the electrostatic attraction between the opposite charges. The fibers become embedded in the substrate as the fibers move toward the electrostatic plate.

A pressurized gas producing and distribution system may be used to control the flow of fibers toward a substrate disposed below the fiber producing device. During use fibers produced by the fiber producing device are dispersed within the deposition system. Since the fibers are composed primarily of microfibers and/or nanofibers, the fibers tend to disperse within the deposition system. The use of a pressurized gas producing and distribution system may help guide the fibers toward the substrate. In one embodiment, a gas flow system 190 includes a downward gas flow device 195 and a lateral gas flow device 197. Downward gas flow device 195 is positioned above or even with the fiber producing device to facilitate even fiber movement toward the substrate. One or more lateral gas flow devices 197 are oriented perpendicular to or below the fiber producing device. In some embodiment, lateral gas flow devices 197 have an outlet width equal to the substrate width to facilitate even fiber deposition onto substrate. In some embodiments, the angle of the outlet of one or more lateral gas flow devices 197 may be varied to allow better control of the fiber deposition onto the substrate. Each lateral gas flow devices 197 may be independently operated.

During use of the deposition system, fiber producing device 120 may produce various gasses due to evaporation of solvents (during solution spinning) and material gasification (during melt spinning). Such gasses, if accumulated in the deposition system may begin to affect the quality of the fiber produced. In some embodiment, the deposition system includes an outlet fan 185 to remove gasses produced during fiber production from the deposition system.

Substrate transfer system 150, in one embodiment depicted in FIG. 1, is capable of moving a continuous sheet of substrate material through the deposition system. In one embodiment, substrate transfer system 150 includes a substrate reel 152 and a take up reel system 154. During use, a roll of substrate material is placed on substrate reel 152 and threaded through system 100 to the substrate take up reel system 154. During use, substrate take up reel system 154 rotates, pulling substrate through deposition system at a predetermined rate. In this manner, a continuous roll of a substrate material may be pulled through fiber deposition system.

An embodiment of a fiber producing system is depicted in FIGS. 3A-D. Fiber producing system 200 includes a fiber producing device 210. Fiber producing device 210 includes a body 212 and a coupling member 240. Body 212 comprises one or more openings 216 through which material disposed in the body may pass through during use. Fiber producing device 210 may be coupled to a driver 218 using a coupling member 240. Coupling member 240 couples fiber producing device 210 to driver 218, allowing the driver to rotate the fiber producing device during use.

In some embodiments, materials used to form fibers may conveyed into a body of a fiber producing device. In some embodiments, the material may be conveyed to the body under pressure in the form of a pressurized fluid. The material may be in the form of a solution or suspension in a suitable liquid, or the material may be in molten or melted form. Pressurized feed of materials into a fiber producing device may facilitate fiber production by forcing the materials through the openings in addition to the force provided by the spinning body of the device. A pressurized feed system may allow for produced fibers to be ejected from the openings at a higher velocity. A pressurized feed system may also allow for cleaning the fiber producing device by conveying gasses and/or solvents under pressure through the device to facilitate cleaning.

Figure 3A:
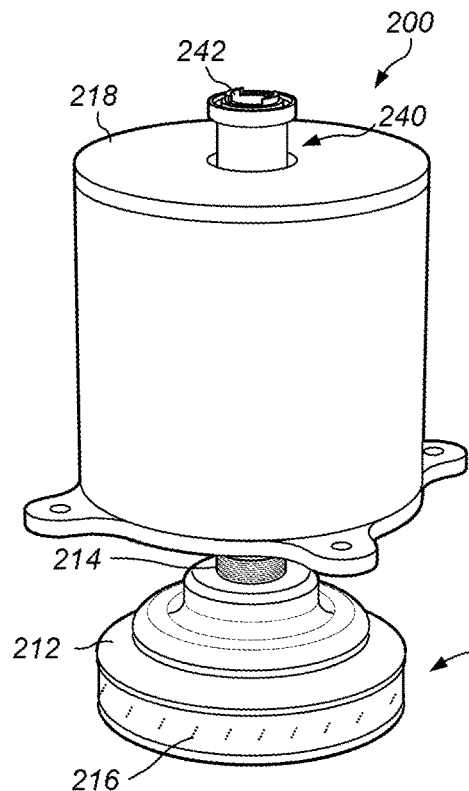
FIG. 3A depicts an embodiment of a fiber producing system with a driver mounted above the fiber producing device.
Figure 3B:
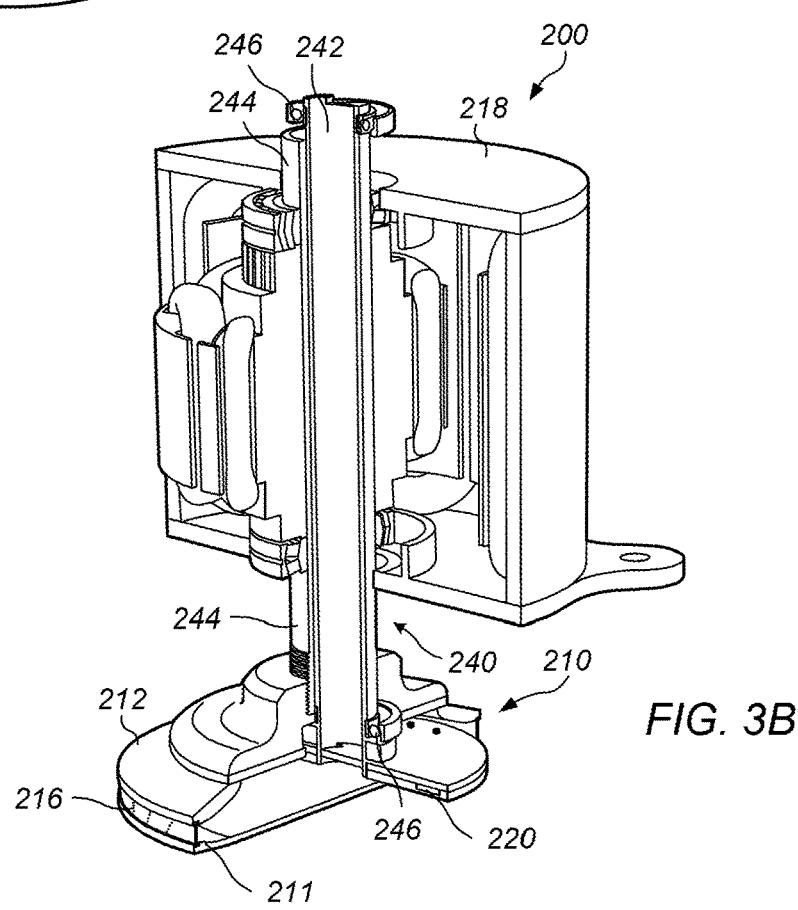
FIG. 3B depicts an embodiment of a cross section of a fiber producing system with a driver mounted above the fiber producing device.

In some embodiments, coupling member 240 includes a material delivery conduit 242 that may be used to convey materials to body 212. Material conduit 242 may convey materials through driver 218 (e.g., as depicted in FIG. 3B). Conveying materials through material delivery conduit 242 may allow the material to be delivered in an atmosphere other than air/oxygen. For example, using an inert gas to pressurize the fluid (e.g., nitrogen or argon) allows delivery of air or oxygen sensitive materials to the fiber producing device.

Coupling member 240 also includes a driving conduit 244. Driving conduit 244 is coupled to body 212 of the fiber producing device and driver 218. During use, operation of driver 218 causes driving conduit 244 to rotate which, in turn, causes fiber producing device 210 to rotate. In an embodiment, material delivery conduit 242 is disposed within driving conduit 244. During use, material delivery conduit 242 remains substantially stationary while driving conduit 244 rotates around the material delivery conduit. Coupling member 240 may include one or more bearings 246 which are positioned between driving conduit 244 and material delivery conduit 242. During use, bearings 246 provide a surface for driving conduit 244 to rotate around material delivery conduit 242. Bearings 246 also create a gap between driving conduit 244 and material delivery conduit 242. This gap helps to inhibit contact of driving conduit 244 with the material delivery conduit 242. The gap also serves as an insulating space which helps maintain the temperature of any material passing through material delivery conduit 242.

The interior cavity of the body may include angled or rounded walls 211 to help direct material disposed in body 212 toward openings 216. In some embodiments, an interior cavity of body 212 may have few or no angled or rounded walls to help direct material disposed in body 212 because such angled walls are not necessary due to the material and/or the speed at which the body is spinning during the process.

Figure 3C:
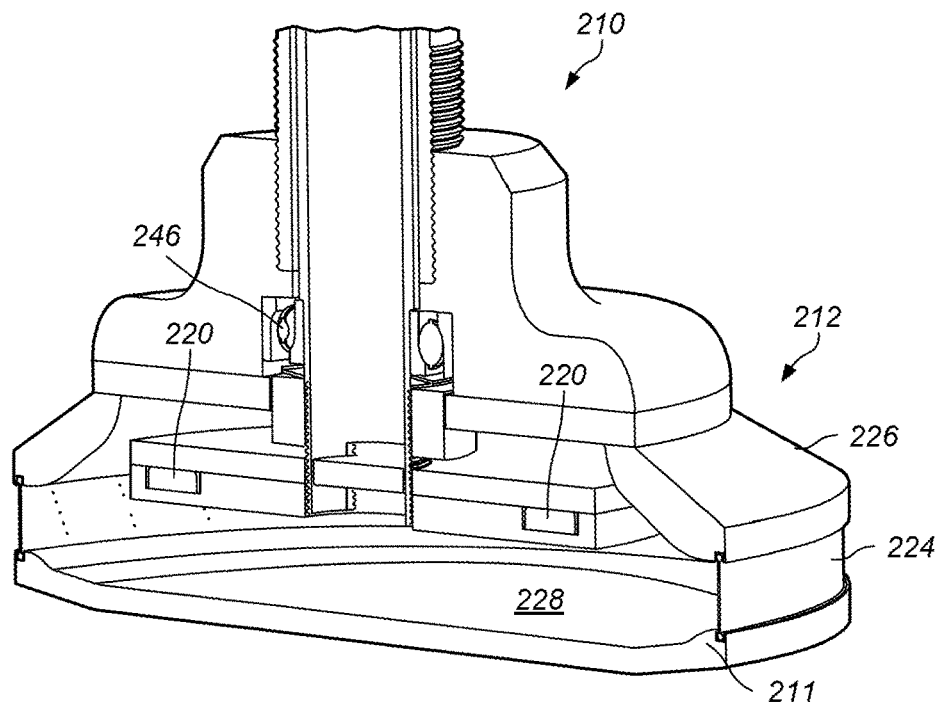
FIG. 3C depicts an embodiment of a cross section of a body of a fiber producing system.

In some embodiment, fiber producing device 210 may include internal heating device 220 (e.g., depicted in FIGS. 3B-3C). Heating device 220 may function to heat material conveyed into body 212 facilitating the production of fibers as the material is conveyed through one or more openings 216. Heating device 220 may heat material inductively or radiantly. In some embodiments, a heating device may heat material conductively, inductively or radiantly. In some embodiments, a heating device may heat material using RF, lasers, or infrared.

In some embodiments, heating device 220 maybe coupled to material delivery conduit and remain substantially motionless in relation to body 212 during use such that as body 212 spins, heating device 220 remains relatively motionless. In some embodiments, one or more wires (not shown) may be coupled to material delivery conduit to supply power to heating device 220.

In some embodiments, a driver may include a direct drive coupled to a body of a fiber producing device. A direct drive system may increase the efficiency of the fiber producing system. Direct drive mechanisms are typically devices that take the power coming from a motor without any reductions (e.g., a gearbox). In addition to increased efficiency a direct drive has other advantages including reduced noise, longer lifetime, and providing high torque a low rpm. Material delivery conduit 222 may in some embodiments convey materials through driver 218 (e.g., as depicted in FIG. 3B), in some embodiments driver 218 may include a direct driver.

Figure 3D:
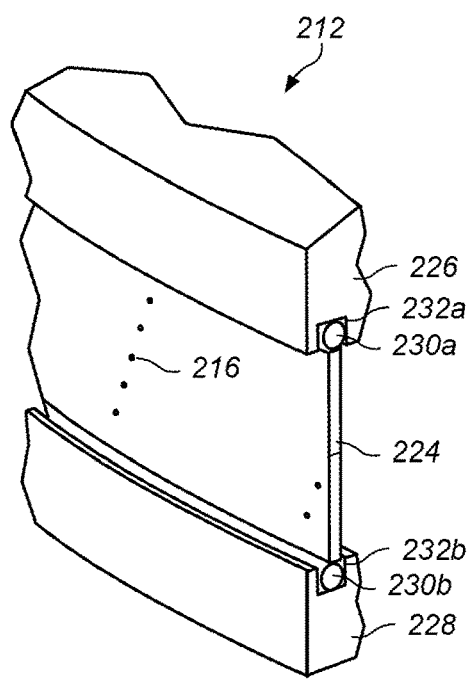
FIG. 3D depicts an embodiment of a cross section of a body of a portion of a sidewall, top member, and bottom member of a fiber producing system.

FIG. 3D depicts an embodiment of a cross section of a body 212 of a portion of a sidewall 224, top member 226, and bottom member 228 of a fiber producing system. Fiber producing system 200 includes a fiber producing device 210. Fiber producing device 210 includes a body 212 and a coupling member 240. Body 212 comprises one or more openings 216 through which material disposed in the body may pass through during use. Sidewall 224 may include a plurality of openings 216. In some embodiments, the plurality of openings may include a patterned array of openings. The patterned array may include a repeating pattern. The pattern may be such that no opening in the pattern is aligned vertically with another opening. The pattern may be such as to include a minimum distance between openings horizontally. In some embodiments, a pattern may inhibit entwining of fibers. Inhibition of fiber entwining or "roping" may result in a more consistent fiber product and better product.

Different patterns of openings may be desired and/or one or more openings may become clogged during normal use. In some embodiments, sidewall 224 of body 212 may be replaced without having to replace any other components of a fiber producing device. Sidewall 224 may be couplable to top member 226, and bottom member 228 of a fiber producing system. Edges 230a and 230b of a sidewall may fit within channels 232a and 232b of top member 226 and bottom member 228 respectively. Edges 230 may function to couple sidewall 224 to top member 226 and bottom member 228. In some embodiments, the edges of the sidewall may form a friction fit with the channels of the top and bottom members. In some embodiments, the edges of the sidewall may have a cross section similar to a cross section of the channels of the top and bottom members such that the edges may slide into the channels in a lateral direction but inhibited from being pulled out of the channels in any other direction.

In some embodiments, a fiber producing device may include a body. The body may be formed such that a portion of the body may function to facilitate conveyance of produced fibers away from the body. Body of a fiber producing device may include one or more draft members. In some embodiments, a fiber producing device may include two or more draft members. In some embodiments, a fiber producing device may include four draft members. Draft members may function as blades on a fan creating a gas flow relative to the body when the fiber producing device is rotated. The gas of the glass flow is composed of the gas in the environment surrounding the fiber producing device. For example, the gas may be air, if the fiber producing device is run under ambient conditions. If the fiber producing device is run in an enclosed, controlled environment (e.g., argon, nitrogen), the created gas flow is composed of the gas in the enclosure. The gas flow created by the draft members may facilitate movement of the produced fibers away from the fiber producing device. The gas flow may direct the produced fibers in a fiber producing system. In some embodiments, draft members may be angled with respect to a plane perpendicular to the axis of rotation. Thus, draft members may be angled, much like blades of a fan, increasing the amount of gas flow produced by the draft members. In some embodiments, an angle of the draft members may be adjusted by a user in order to increase/decrease the amount of gas flow produced during use. Upon adjustment the draft members may be locked into place.

Fibers as discussed herein may be created using, for example, a solution spinning method or a melt spinning method. In both the melt and solution spinning methods, a material may be put into a fiber producing device which is spun at various speeds until fibers of appropriate dimensions are made. The material may be formed, for example, by melting a solute or may be a solution formed by dissolving a mixture of a solute and a solvent. Any solution or melt familiar to those of ordinary skill in the art may be employed. For solution spinning, a material may be designed to achieve a desired viscosity, or a surfactant may be added to improve flow, or a plasticizer may be added to soften a rigid fiber. In melt spinning, solid particles may comprise, for example, a metal or a polymer, wherein polymer additives may be combined with the latter. Certain materials may be added for alloying purposes (e.g., metals) or adding value (such as antioxidant or colorant properties) to the desired fibers.

Non-limiting examples of reagents that may be melted, or dissolved or combined with a solvent to form a material for melt or solution spinning methods include polyolefin, polyacetal, polyamide, polyester, cellulose ether and ester (e.g., cellulose acetate, cellulose diacetate, cellulose triacetate, etc.), polyalkylene sulfide, polyarylene oxide, polysulfone, modified polysulfone polymers and mixtures thereof. Non-limiting examples of solvents that may be used include oils, lipids and organic solvents such as DMSO, toluene and alcohols. Water, such as de-ionized water, may also be used as a solvent. For safety purposes, non-flammable solvents are preferred.

In either the solution or melt spinning method, as the material is ejected from the spinning fiber producing device, thin jets of the material are simultaneously stretched and dried or stretched and cooled in the surrounding environment. Interactions between the material and the environment at a high strain rate (due to stretching) leads to solidification of the material into fibers, which may be accompanied by evaporation of solvent. By manipulating the temperature and strain rate, the viscosity of the material may be controlled to manipulate the size and morphology of the fibers that are created. A wide variety of fibers may be created using the present methods, including novel fibers such as polypropylene (PP) nanofibers. Non-limiting examples of fibers made using the melt spinning method include polypropylene, acrylonitrile butadiene styrene (ABS) and nylon. Non-limiting examples of fibers made using the solution spinning method include polyethylene oxide (PEO) and beta-lactams.

The creation of fibers may be done in batch modes or in continuous modes. In the latter case, material can fed continuously into the fiber producing device and the process can be continued over days (e.g., 1-7 days) and even weeks (e.g., 1-4 weeks).

The methods discussed herein may be used to create, for example, nanocomposites and functionally graded materials that can be used for fields as diverse as, for example, drug delivery and ultrafiltration (such as electrets). Metallic and ceramic nanofibers, for example, may be manufactured by controlling various parameters, such as material selection and temperature. At a minimum, the methods and apparatuses discussed herein may find application in any industry that utilizes micro- to nano-sized fibers and/or micro- to nano-sized composites. Such industries include, but are not limited to, material engineering, mechanical engineering, military/defense industries, biotechnology, medical devices, tissue engineering industries, food engineering, drug delivery, electrical industries, or in ultrafiltration and/or microelectric mechanical systems (MEMS).

Some embodiments of a fiber producing device may be used for melt and/or solution processes. Some embodiments of a fiber producing device may be used for making organic and/or inorganic fibers. With appropriate manipulation of the environment and process, it is possible to form fibers of various configurations, such as continuous, discontinuous, mat, random fibers, unidirectional fibers, woven and non-woven, as well as fiber shapes, such as circular, elliptical and rectangular (e.g., ribbon). Other shapes are also possible. The produced fibers may be single lumen or multi-lumen.

By controlling the process parameters, fibers can be made in micron, sub-micron and nano-sizes, and combinations thereof. In general, the fibers created will have a relatively narrow distribution of fiber diameters. Some variation in diameter and cross-sectional configuration may occur along the length of individual fibers and between fibers.

Generally speaking, a fiber producing device helps control various properties of the fibers, such as the cross-sectional shape and diameter size of the fibers. More particularly, the speed and temperature of a fiber producing device, as well as the cross-sectional shape, diameter size and angle of the outlets in a fiber producing device, all may help control the cross-sectional shape and diameter size of the fibers. Lengths of fibers produced may also be influenced by the choice of fiber producing device used.

The temperature of the fiber producing device may influence fiber properties, in certain embodiments. Both resistance and inductance heaters may be used as heat sources to heat a fiber producing device. In certain embodiments, the fiber producing device is thermally coupled to a heat source that may be used to adjust the temperature of the fiber producing device before spinning, during spinning, or both before spinning and during spinning. In some embodiments, the fiber producing device is cooled. For example, a fiber producing device may be thermally coupled to a cooling source that can be used to adjust the temperature of the fiber producing device before spinning, during spinning, or before and during spinning. Temperatures of a fiber producing device may range widely. For example, a fiber producing device may be cooled to as low as −20 C or heated to as high as 2500 C. Temperatures below and above these exemplary values are also possible. In certain embodiments, the temperature of a fiber producing device before and/or during spinning is between about 4° C. and about 400° C. The temperature of a fiber producing device may be measured by using, for example, an infrared thermometer or a thermocouple.

The speed at which a fiber producing device is spun may also influence fiber properties. The speed of the fiber producing device may be fixed while the fiber producing device is spinning, or may be adjusted while the fiber producing device is spinning. Those fiber producing devices whose speed may be adjusted may, in certain embodiments, be characterized as variable speed fiber producing devices. In the methods described herein, the fiber producing device may be spun at a speed of about 500 RPM to about 25,000 RPM, or any range derivable therein. In certain embodiments, the fiber producing device is spun at a speed of no more than about 50,000 RPM, about 45,000 RPM, about 40,000 RPM, about 35,000 RPM, about 30,000 RPM, about 25,000 RPM, about 20,000 RPM, about 15,000 RPM, about 10,000 RPM, about 5,000 RPM, or about 1,000 RPM. In certain embodiments, the fiber producing device is rotated at a rate of about 5,000 RPM to about 25,000 RPM.

In an embodiment, a method of creating fibers, such as microfibers and/or nanofibers, includes: heating a material; placing the material in a heated fiber producing device; and, after placing the heated material in the heated fiber producing device, rotating the fiber producing device to eject material to create nanofibers from the material. In some embodiments, the fibers may be microfibers and/or nanofibers. A heated fiber producing device is a structure that has a temperature that is greater than ambient temperature. "Heating a material" is defined as raising the temperature of that material to a temperature above ambient temperature. "Melting a material" is defined herein as raising the temperature of the material to a temperature greater than the melting point of the material, or, for polymeric materials, raising the temperature above the glass transition temperature for the polymeric material. In alternate embodiments, the fiber producing device is not heated. Indeed, for any embodiment that employs a fiber producing device that may be heated, the fiber producing device may be used without heating. In some embodiments, the fiber producing device is heated but the material is not heated. The material becomes heated once placed in contact with the heated fiber producing device. In some embodiments, the material is heated and the fiber producing device is not heated. The fiber producing device becomes heated once it comes into contact with the heated material.

A wide range of volumes/amounts of material may be used to produce fibers. In addition, a wide range of rotation times may also be employed. For example, in certain embodiments, at least 5 milliliters (mL) of material are positioned in a fiber producing device, and the fiber producing device is rotated for at least about 10 seconds. As discussed above, the rotation may be at a rate of about 500 RPM to about 25,000 RPM, for example. The amount of material may range from mL to liters (L), or any range derivable therein. For example, in certain embodiments, at least about 50 mL to about 100 mL of the material are positioned in the fiber producing device, and the fiber producing device is rotated at a rate of about 500 RPM to about 25,000 RPM for about 300 seconds to about 2,000 seconds. In certain embodiments, at least about 5 mL to about 100 mL of the material are positioned in the fiber producing device, and the fiber producing device is rotated at a rate of 500 RPM to about 25,000 RPM for 10-500 seconds. In certain embodiments, at least 100 mL to about 1,000 mL of material is positioned in the fiber producing device, and the fiber producing device is rotated at a rate of 500 RPM to about 25,000 RPM for about 100 seconds to about 5,000 seconds. Other combinations of amounts of material, RPMs and seconds are contemplated as well.

Typical dimensions for fiber producing devices are in the range of several inches in diameter and in height. In some embodiments, a fiber producing device has a diameter of between about 1 inch to about 60 inches, from about 2 inches to about 30 inches, or from about 5 inches to about 25 inches. The height of the fiber producing device may range from about 1 inch to about 10 inches, from about 2 inches to about 8 inches, or from about 3 inches to about 5 inches.

In certain embodiments, fiber producing device includes at least one opening and the material is extruded through the opening to create the nanofibers. In certain embodiments, the fiber producing device includes multiple openings and the material is extruded through the multiple openings to create the nanofibers. These openings may be of a variety of shapes (e.g., circular, elliptical, rectangular, square) and of a variety of diameter sizes (e.g., 0.01-0.80 mm). When multiple openings are employed, not every opening need be identical to another opening, but in certain embodiments, every opening is of the same configuration. Some opens may include a divider that divides the material, as the material passes through the openings. The divided material may form multi-lumen fibers.

In an embodiment, material may be positioned in a reservoir of a fiber producing device. The reservoir may, for example, be defined by a concave cavity of the heated structure. In certain embodiments, the heated structure includes one or more openings in communication with the concave cavity. The fibers are extruded through the opening while the fiber producing device is rotated about a spin axis. The one or more openings have an opening axis that is not parallel with the spin axis. The fiber producing device may include a body that includes the concave cavity and a lid positioned above the body.

Another fiber producing device variable includes the material(s) used to make the fiber producing device. Fiber producing devices may be made of a variety of materials, including metals (e.g., brass, aluminum, stainless steel) and/or polymers. The choice of material depends on, for example, the temperature the material is to be heated to, or whether sterile conditions are desired.

Any method described herein may further comprise collecting at least some of the microfibers and/or nanofibers that are created. As used herein "collecting" of fibers refers to fibers coming to rest against a fiber collection device. After the fibers are collected, the fibers may be removed from a fiber collection device by a human or robot. A variety of methods and fiber (e.g., nanofiber) collection devices may be used to collect fibers.

Regarding the fibers that are collected, in certain embodiments, at least some of the fibers that are collected are continuous, discontinuous, mat, woven, nonwoven or a mixture of these configurations. In some embodiments, the fibers are not bundled into a cone shape after their creation. In some embodiments, the fibers are not bundled into a cone shape during their creation. In particular embodiments, fibers are not shaped into a particular configuration, such as a cone figuration, using gas, such as ambient air, that is blown onto the fibers as they are created and/or after they are created.

Present method may further comprise, for example, introducing a gas through an inlet in a housing, where the housing surrounds at least the heated structure. The gas may be, for example, nitrogen, helium, argon, or oxygen. A mixture of gases may be employed, in certain embodiments.

The environment in which the fibers are created may comprise a variety of conditions. For example, any fiber discussed herein may be created in a sterile environment. As used herein, the term "sterile environment" refers to an environment where greater than 99% of living germs and/or microorganisms have been removed. In certain embodiments, "sterile environment" refers to an environment substantially free of living germs and/or microorganisms. The fiber may be created, for example, in a vacuum. For example the pressure inside a fiber producing system may be less than ambient pressure. In some embodiments, the pressure inside a fiber producing system may range from about 1 millimeters (mm) of mercury (Hg) to about 700 mm Hg. In other embodiments, the pressure inside a fiber producing system may be at or about ambient pressure. In other embodiments, the pressure inside a fiber producing system may be greater than ambient pressure. For example the pressure inside a fiber producing system may range from about 800 mm Hg to about 4 atmospheres (atm) of pressure, or any range derivable therein.

In certain embodiments, the fiber is created in an environment of 0-100% humidity, or any range derivable therein.

The temperature of the environment in which the fiber is created may vary widely. In certain embodiments, the temperature of the environment in which the fiber is created can be adjusted before operation (e.g., before rotating) using a heat source and/or a cooling source. Moreover, the temperature of the environment in which the fiber is created may be adjusted during operation using a heat source and/or a cooling source. The temperature of the environment may be set at sub-freezing temperatures, such as −20° C., or lower. The temperature of the environment may be as high as, for example, 2500° C.

The material employed may include one or more components. The material may be of a single phase (e.g., solid or liquid) or a mixture of phases (e.g., solid particles in a liquid). In some embodiments, the material includes a solid and the material is heated. The material may become a liquid upon heating. In another embodiment, the material may be mixed with a solvent. As used herein a "solvent" is a liquid that at least partially dissolves the material. Examples of solvents include, but are not limited to, water and organic solvents. Examples of organic solvents include, but are not limited to: hexanes, ether, ethyl acetate, acetone, dichloromethane, chloroform, toluene, xylenes, petroleum ether, dimethylsulfoxide, dimethylformamide, or mixtures thereof. Additives may also be present. Examples of additives include, but are not limited to: thinners, surfactants, plasticizers, or combinations thereof.

The material used to form the fibers may include at least one polymer. Polymers that may be used include conjugated polymers, biopolymers, water soluble polymers, and particle infused polymers. Examples of polymers that may be used include, but are not limited to polypropylenes, polyethylenes, polyolefins, polystyrenes, polyesters, fluorinated polymers (fluoropolymers), polyamides, polyaramids, acrylonitrile butadiene styrene, nylons, polycarbonates, beta-lactams, block copolymers or any combination thereof. The polymer may be a synthetic (man-made) polymer or a natural polymer. The material used to form the fibers may be a composite of different polymers or a composite of a medicinal agent combined with a polymeric carrier. Specific polymers that may be used include, but are not limited to chitosan, nylon, nylon-6, polybutylene terephthalate (PBT), polyacrylonitrile (PAN), poly(lactic acid) (PLA), poly(lactic-co-glycolic acid) (PLGA), polyglycolic acid (PGA), polyglactin, polycaprolactone (PCL), silk, collagen, poly (methyl methacrylate) (PMMA), polydioxanone, polyphenylene sulfide (PPS); polyethylene terephthalate (PET), polytetrafluoroethylene (PTFE), polyvinylidene fluoride (PVDF), polypropylene (PP), polyethylene oxide (PEO), acrylonitrile butadiene, styrene (ABS), and polyvinylpyrrolidone (PVP). These polymers may be processed as either a melt or as a solution in a suitable solvent.

In another embodiment, the material used to form the fibers may be a metal, ceramic, or carbon-based material. Metals employed in fiber creation include, but are not limited to, bismuth, tin, zinc, silver, gold, nickel, aluminum, or combinations thereof. The material used to form the fibers may be a ceramic such as alumina, titania, silica, zirconia, or combinations thereof. The material used to form the fibers may be a composite of different metals (e.g., an alloy such as nitonol), a metal/ceramic composite or ceramic oxides (e.g., PVP with germanium/palladium/platinum).

The fibers that are created may be, for example, one micron or longer in length. For example, created fibers may be of lengths that range from about 1 μm to about 50 cm, from about 100 μm to about 10 cm, or from about 1 mm to about 1 cm. In some embodiments, the fibers may have a narrow length distribution. For example, the length of the fibers may be between about 1 μm to about 9 μm, between about 1 mm to about 9 mm, or between about 1 cm to about 9 cm. In some embodiments, when continuous methods are performed, fibers of up to about 10 meters, up to about 5 meters, or up to about 1 meter in length may be formed.

In certain embodiments, the cross-section of the fiber may be circular, elliptical or rectangular. Other shapes are also possible. The fiber may be a single-lumen fiber or a multi-lumen fiber.

In another embodiment of a method of creating a fiber, the method includes: spinning material to create the fiber; where, as the fiber is being created, the fiber is not subjected to an externally-applied electric field or an externally-applied gas; and the fiber does not fall into a liquid after being created.

Fibers discussed herein are a class of materials that exhibit an aspect ratio of at least 100 or higher. The term "microfiber" refers to fibers that have a minimum diameter in the range of 10 microns to 700 nanometers, or from 5 microns to 800 nanometers, or from 1 micron to 700 nanometers. The term "nanofiber" refers to fibers that have a minimum diameter in the range of 500 nanometers to 1 nanometer; or from 250 nanometers to 10 nanometers, or from 100 nanometers to 20 nanometers.

While typical cross-sections of the fibers are circular or elliptic in nature, they can be formed in other shapes by controlling the shape and size of the openings in a fiber producing device (described below). Fibers may include a blending of multiple materials. Fibers may also include holes (e.g., lumen or multi-lumen) or pores. Multi-lumen fibers may be achieved by, for example, designing one or more exit openings to possess concentric openings. In certain embodiments, such openings may include split openings (that is, wherein two or more openings are adjacent to each other; or, stated another way, an opening possesses one or more dividers such that two or more smaller openings are made). Such features may be utilized to attain specific physical properties, such as thermal insulation or impact absorbance (resilience). Nanotubes may also be created using methods and apparatuses discussed herein.

Fibers may be analyzed via any means known to those of skill in the art. For example, Scanning Electron Microscopy (SEM) may be used to measure dimensions of a given fiber. For physical and material characterizations, techniques such as differential scanning calorimetry (DSC), thermal analysis (TA) and chromatography may be used.

In particular embodiments, a fiber of the present fibers is not a lyocell fiber. Lyocell fibers are described in the literature, such as in U.S. Pat. Nos. 6,221,487, 6,235,392, 6,511,930, 6,596,033 and 7,067,444, each of which is incorporated herein by reference.

In one embodiment, microfibers and nanofibers may be produced substantially simultaneously. Any fiber producing device described herein may be modified such that one or more openings has a diameter and/or shape that produces nanofibers during use, and one or more openings have a diameter and/or shape that produces microfibers during use. Thus, a fiber producing device, when rotated will eject material to produce both microfibers and nanofibers. In some embodiments, nozzles may be coupled to one or more of the openings. Different nozzles may be coupled to different openings such that the nozzles designed to create microfibers and nozzles designed to create nanofibers are coupled to the openings. In an alternate embodiment, needles may be coupled (either directly to the openings or via a needle port). Different needles may be coupled to different openings such that needles designed to create microfibers and needles designed to create nanofibers are coupled to the openings. Production of microfibers and nanofibers substantially simultaneously may allow a controlled distribution of the fiber size to be achieved, allowing substantial control of the properties of products ultimately produced from the microfiber/nanofiber mixture.

After production of fibers is completed, it is desirable to clean the fiber producing device to allow reuse of the system. Generally, it is easiest to clean a fiber producing device when the material is in a liquid state. Once the material reverts to a solid, cleaning may be difficult, especially cleaning up small diameter nozzles and or needles coupled to the fiber producing device. The difficulty, especially with melt spinning, is that cleanup may also be difficult when the device is at an elevated temperature, especially if the fiber producing device needs to be cooled prior to handling for cleanup. In some embodiments, a purge system may be couplable to fiber producing device when the fiber producing device is heated. A purge system may provide an at least partial seal between the purge system and the body of a fiber producing device such that a gas may be directed into the body, through the purge system, to create a pressurized gas inside of the body. The purge system, in some embodiments, includes a sealing member couplable to the body, a pressurized gas source, and a conduit coupling the pressurized gas source to the sealing member.

Microfibers and nanofibers produced using any of the devices and methods described herein may be used in a variety of applications. Some general fields of use include, but are not limited to: food, materials, electrical, defense, tissue engineering, biotechnology, medical devices, energy, alternative energy (e.g., solar, wind, nuclear, and hydroelectric energy); therapeutic medicine, drug delivery (e.g., drug solubility improvement, drug encapsulation, etc.); textiles/fabrics, nonwoven materials, filtration (e.g., air, water, fuel, semiconductor, biomedical, etc); automotive; sports; aeronautics; space; energy transmission; papers; substrates; hygiene; cosmetics; construction; apparel, packaging, geotextiles, thermal and acoustic insulation.

Some products that may be formed using microfibers and/or nanofibers include but are not limited to: filters using charged nanofiber and/or microfiber polymers to clean fluids; catalytic filters using ceramic nanofibers ("NF"); carbon nanotube ("CNT") infused nanofibers for energy storage; CNT infused/coated NF for electromagnetic shielding; mixed micro and NF for filters and other applications; polyester infused into cotton for denim and other textiles; metallic nanoparticles or other antimicrobial materials infused onto/coated on NT for filters; wound dressings, cell growth substrates or scaffolds; battery separators; charged polymers or other materials for solar energy; NT for use in environmental clean-up; piezoelectric fibers; sutures; chemical sensors; textiles/fabrics that are water & stain resistant, odor resistant, insulating, self-cleaning, penetration resistant, anti-microbial, porous/breathing, tear resistant, and wear resistant; force energy absorbing for personal body protection armor; construction reinforcement materials (e.g., concrete and plastics); carbon fibers; fibers used to toughen outer skins for aerospace applications; tissue engineering substrates utilizing aligned or random fibers; tissue engineering Petri dishes with aligned or random nanofibers; filters used in pharmaceutical manufacturing; filters combining microfiber and nanofiber elements for deep filter functionality; hydrophobic materials such as textiles; selectively absorbent materials such as oil booms; continuous length nanofibers (aspect ratio of more than 1,000 to 1); paints/stains; building products that enhance durability, fire resistance, color retention, porosity, flexibility, anti-microbial, bug resistant, air tightness; adhesives; tapes; epoxies; glues; adsorptive materials; diaper media; mattress covers; acoustic materials; and liquid, gas, chemical, or air filters.

Fibers may be coated after formation. In one embodiment, microfibers and/or nanofibers may be coated with a polymeric or metal coating. Polymeric coatings may be formed by spray coating the produced fibers, or any other method known for forming polymeric coatings. Metal coatings may be formed using a metal deposition process (e.g., CVD).

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

In general, the nanofibers have a tendency to fall or distribute onto the substrate in a circular or doughnut shaped distribution, with the radius of the doughnut reflecting the distance the fibers are ejected from the spinneret. In other words, the nanofibers in general are not distributed onto a substrate in a uniform layer. The uneven distribution of fibers on the substrate is further complicated when the substrate is continuously moving throughout the chamber. For example, as the substrate laterally moves through the chamber, the nanofibers have a tendency to be laid on the substrate in a circular or doughnut configuration and as additional nanofibers are produced by the circular spinnerets, new circular layers are created and overlap previously generated layers. The fiber distribution on the moving substrate (e.g., measured as laid-down mass of fibers per unit area, such as a basis weight measured in grams per square meter ("GSM")) can tend to have a minimum underneath the rotating spinneret and maxima at lateral distances away from the spinneret, reflecting the ejection distance. Such an uneven distribution can reduce the effectiveness of the fiber imbued substrate. It is therefore desirable to have a system and method capable of improving the distribution pattern of fibers on a substrate, particularly a moving substrate.

In many situations, it can be advantageous to generate a uniform layer of nanofibers on a substrate. Accordingly, embodiments disclosed herein provide systems, methods, and devices for overcoming some or all of the foregoing challenges in order to produce uniform layers of nanofibers on substrate. In other embodiments, the systems, methods, and devices can be used to provide any type of fiber distribution that is desired or practical for a commercial application (e.g., the desired fiber distribution need not be uniform and can have a desired variation or non-uniform distribution).

In an embodiment, the system includes an airflow control system configured to modulate the airflow through and/or around the substrate in order to produce a more uniform layer of nanofibers on the substrate (or any other desired distribution of fibers on the substrate). In an embodiment, the airflow control system is configured to modulate the airflow through a system of a plurality of louvers positioned under the substrate to control the air flow through the substrate at various locations of the substrate. The system of louvers can be configured to be manually controlled or controlled by one or more motors or electrical positioning mechanisms known in the art. The system of louvers can be controlled dynamically in real time based on real-time analysis of the airflow and/or the uniformity of the nanofiber layer on the substrate. In an embodiment, the louver system comprises 2, 5, 10, 15, 20, 27, 31, 45, or more louvers for controlling the airflow through the substrate. The louver system can comprise any number of louvers to control the airflow through the substrate. In order to achieve greater (or lesser) uniformity of the nanofiber layer, the louver system can be configured to comprise a greater (or lesser) number of louvers.

In an embodiment, the louver system can be configured to comprise one or more regions wherein each region comprises a different number of louvers per unit area. In an embodiment, the system is configured to modulate the airflow through a plurality of air modulation mechanisms, for example, fans, ducts, or the like. In an embodiment, the system is configured to modulate the airflow through the substrate by configuring the substrate to comprise a plurality of regions having varying density and/or porosity to control the amount of air that may pass through the substrate. In other embodiments, the airflow control system can additionally or alternatively include sliding and/or rotating vents.

Figure 4:
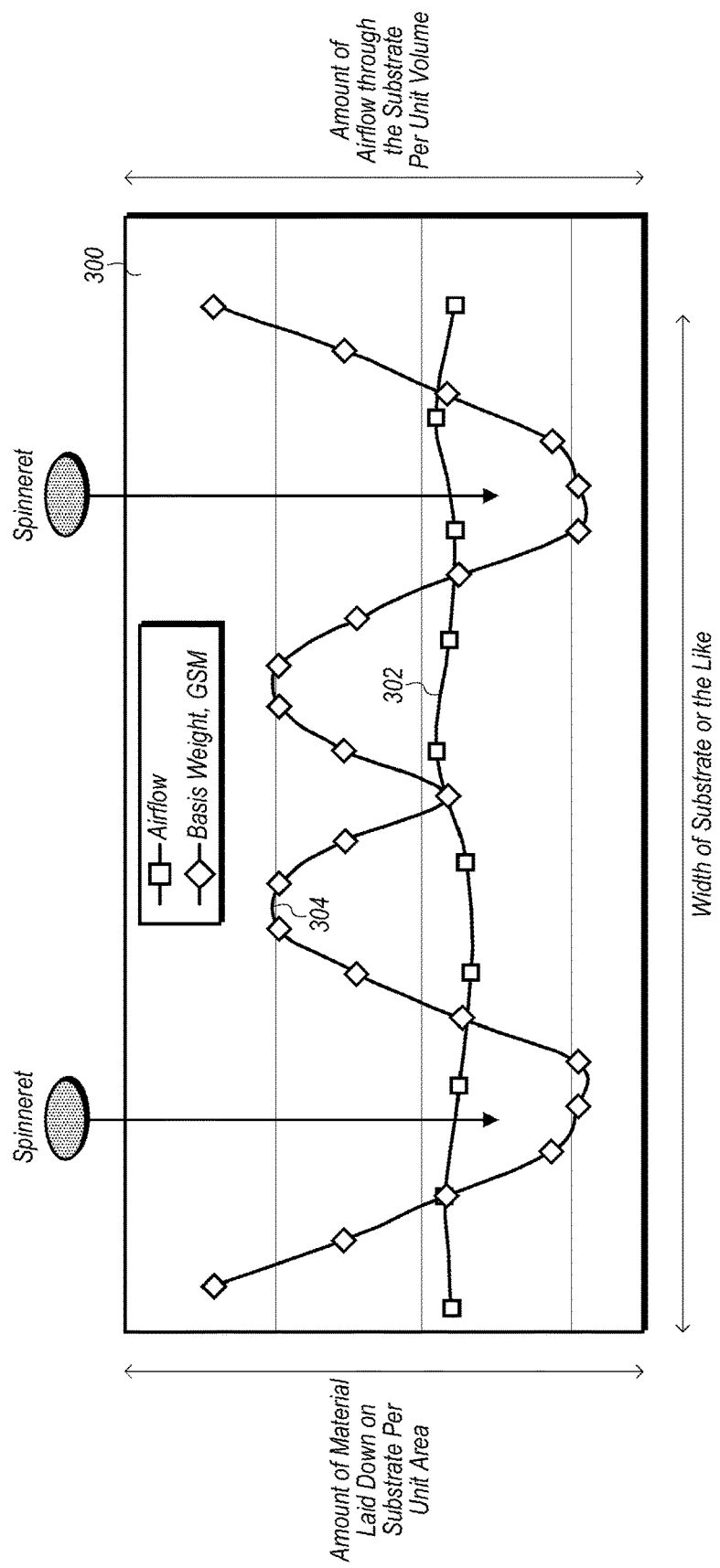
FIG. 4 depicts a graph of a typical fiber deposition pattern on a substrate using two spinnerets to generate fibers.

FIG. 4 depicts a graph of a typical deposition pattern across a substrate 300 when two fiber producing devices (spinnerets) are used to deposit fibers across the substrate. Line 302 represents the average airflow through the substrate at the indicated position. In this embodiment, the airflow was set to be substantially constant throughout the substrate, typical of prior art systems that rely on a uniform airflow system. Line 304 represents the basis weight (GSM) at the indicated positions across the substrate. As can be seen from FIG. 4, the material shows high amounts of material surrounding the location of the spinneret, whereas very little material is deposited below the spinneret.

Figure 5:
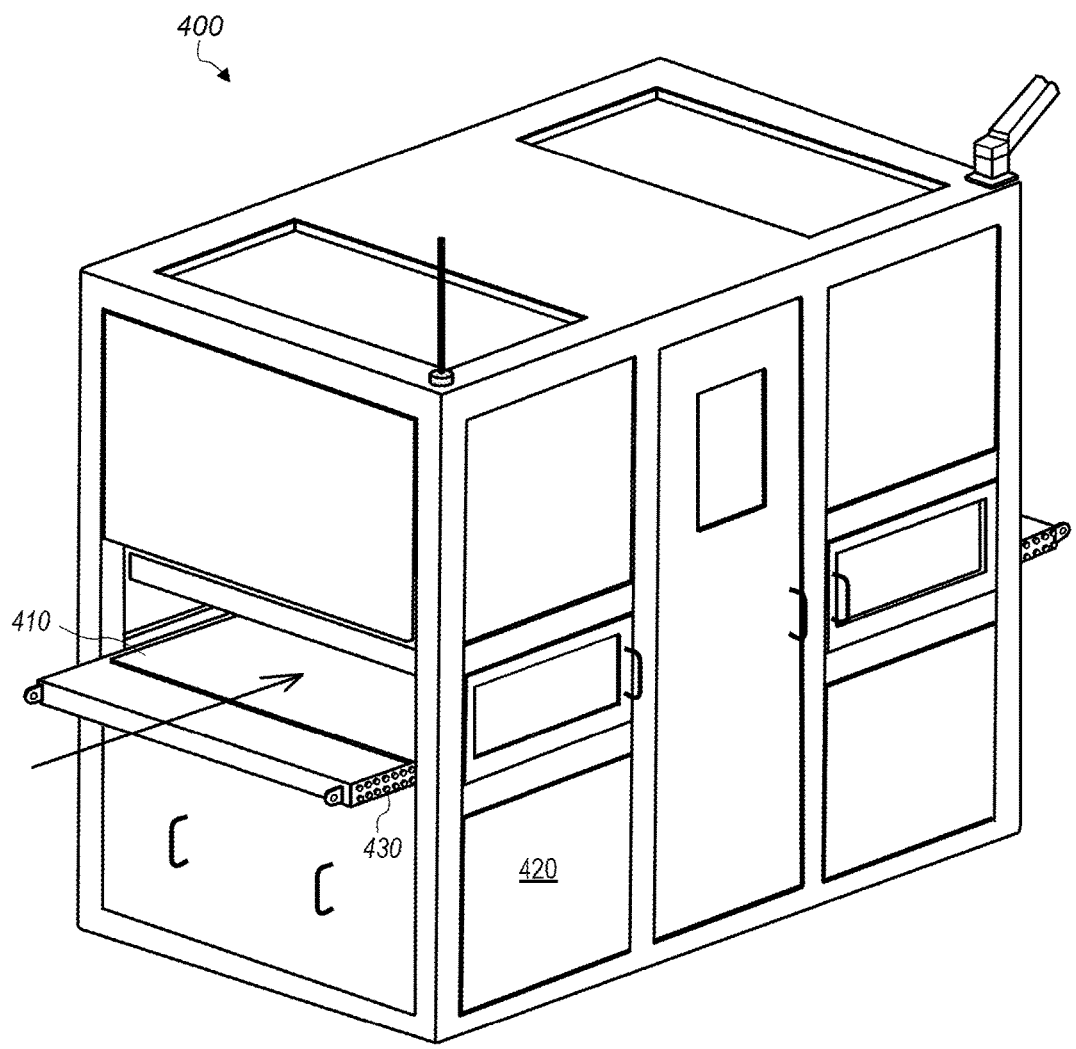
FIG. 5 depicts an embodiment of a fiber deposition system that includes an airflow controlled deposition system.

FIG. 5 depicts a deposition system 400 that directs fibers produced by a fiber producing device (not shown) toward a substrate 410 disposed below the fiber producing device during use. The deposition system comprises an airflow system 420 that draws air through the substrate such that fibers produced by the fiber producing device are drawn toward the substrate. An airflow control system 430 is present which is configured to allow adjustment of an airflow rate through one or more regions of the substrate.

Figure 6:
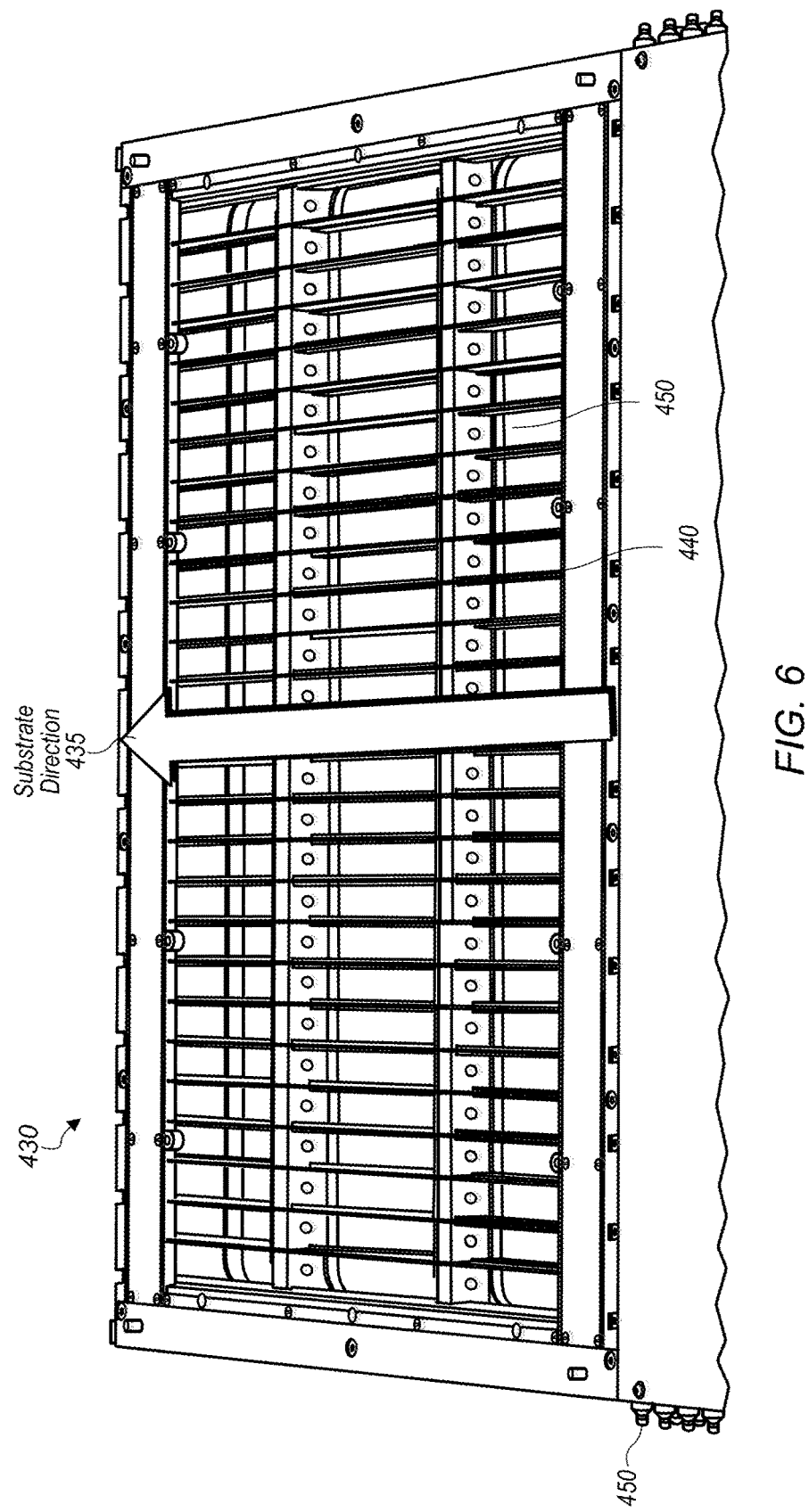
FIG. 6 depicts a substrate support having a plurality of louvers that control airflow through the substrate support.

An embodiment of an airflow control system 430 is depicted in FIG. 6. In this embodiment, the airflow control system 430 is incorporated into the substrate support. During use a substrate is supported by, and passes over substrate support is substrate direction 435. Airflow control system 430 includes a plurality of adjustable louvers 440 incorporated into the substrate support. As shown in FIG. 6, each of the louvers 440 are arranged in a louver chamber 450 which is substantially isolated from the other louver chambers. The position of each individual louver is individually controlled by a plurality of control devices 450 coupled to adjustable louvers 440.

Figure 7:
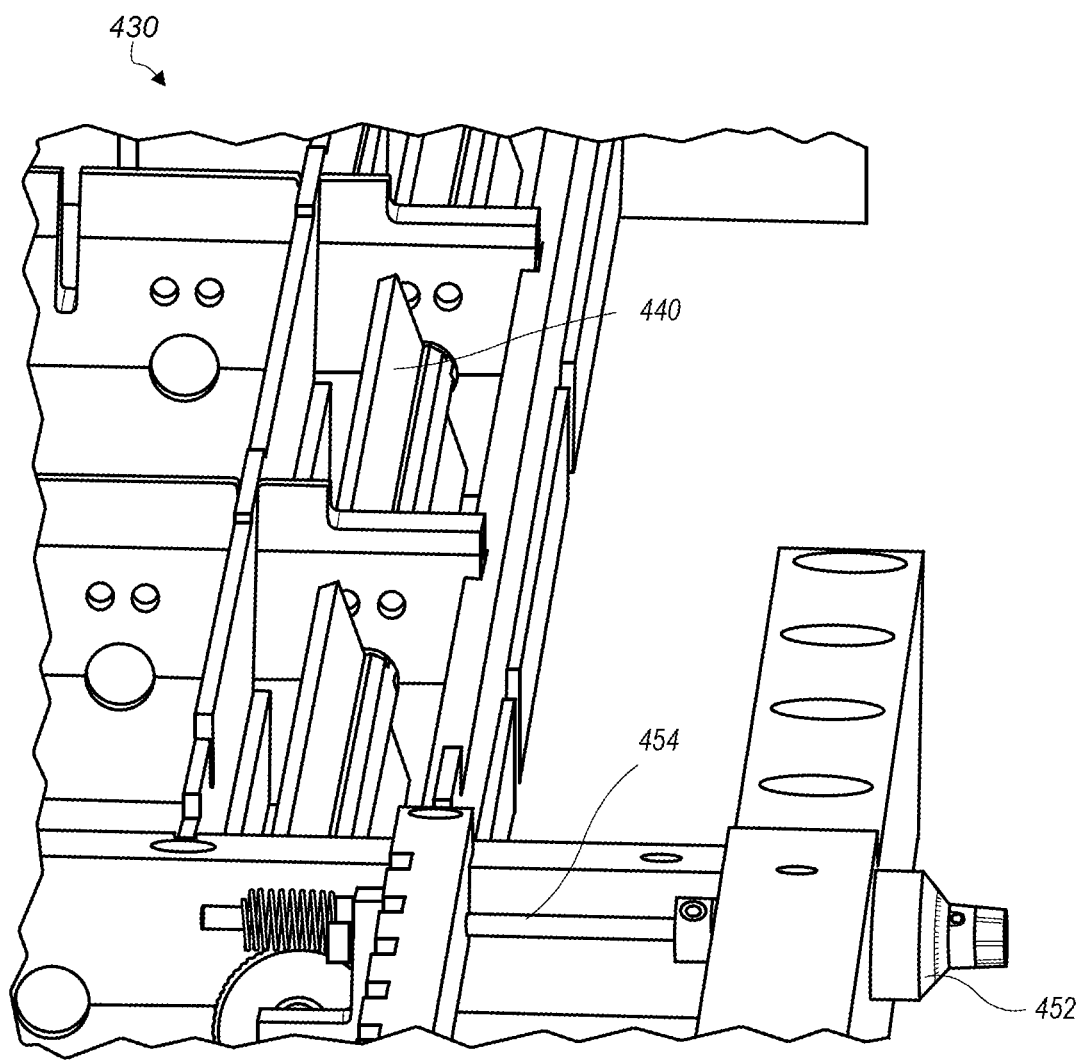
FIG. 7 depicts an enlarged view of a louver and louver control mechanism.
Figure 8C:
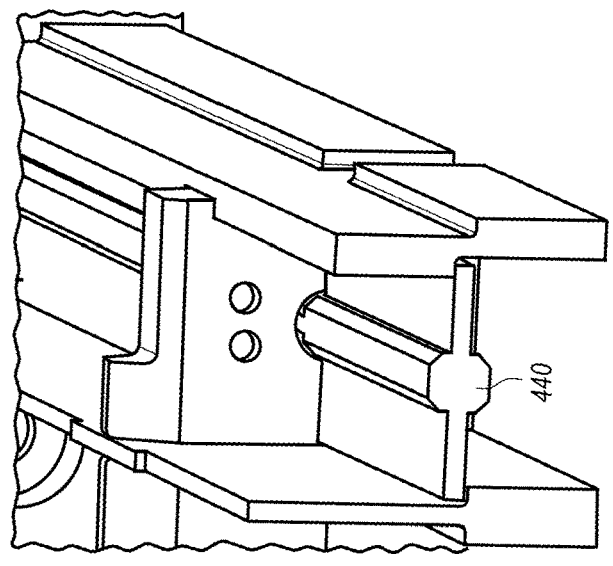
FIGS. 8A-8C depict various louver positions.
Figure 8B:
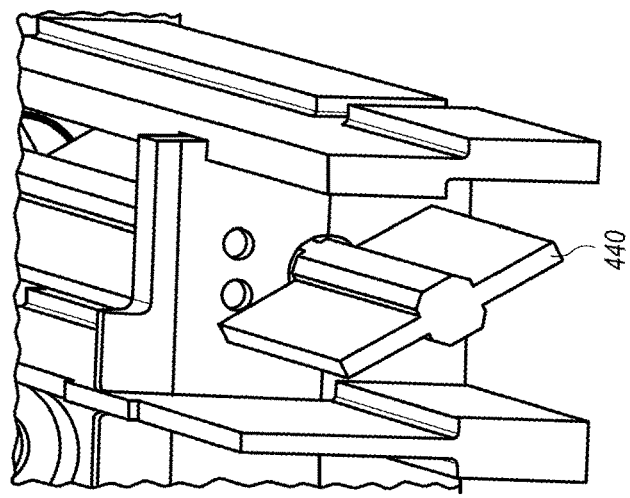
Figure 8A:
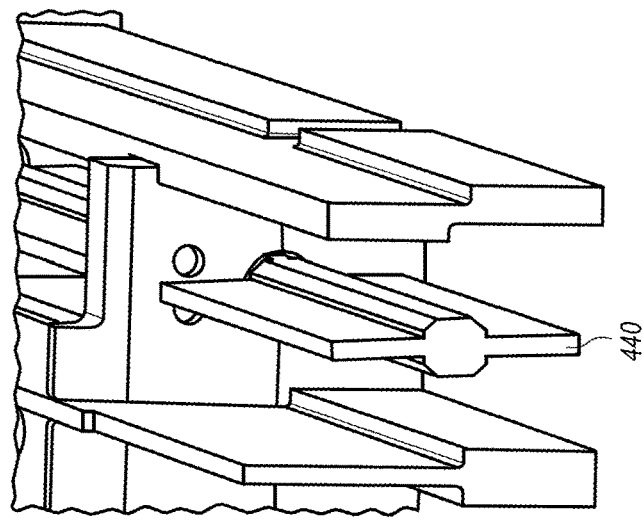

FIG. 7 shows an expanded view of a portion of airflow control system 430 and adjustable louvers 440. In an embodiment, a dial 452 is coupled to an axle and gear system 454 that allows movement of dial 452 to be converted to an adjustment of the louvers 440. Adjustment of dial 452 allows louvers 440 to be placed in various positions, as shown in FIG. 8. For example, louvers 440 may be placed in a fully open position (FIG. 8A), a partially open position (FIG. 8B) of a fully closed position (FIG. 8C). Dial 452 may be manually operated and include markings that indicate an absolute or relative airflow rate through the substrate. Alternatively, dial 452 may be electronically operated by an electronic control system for the deposition system.

Figure 9:
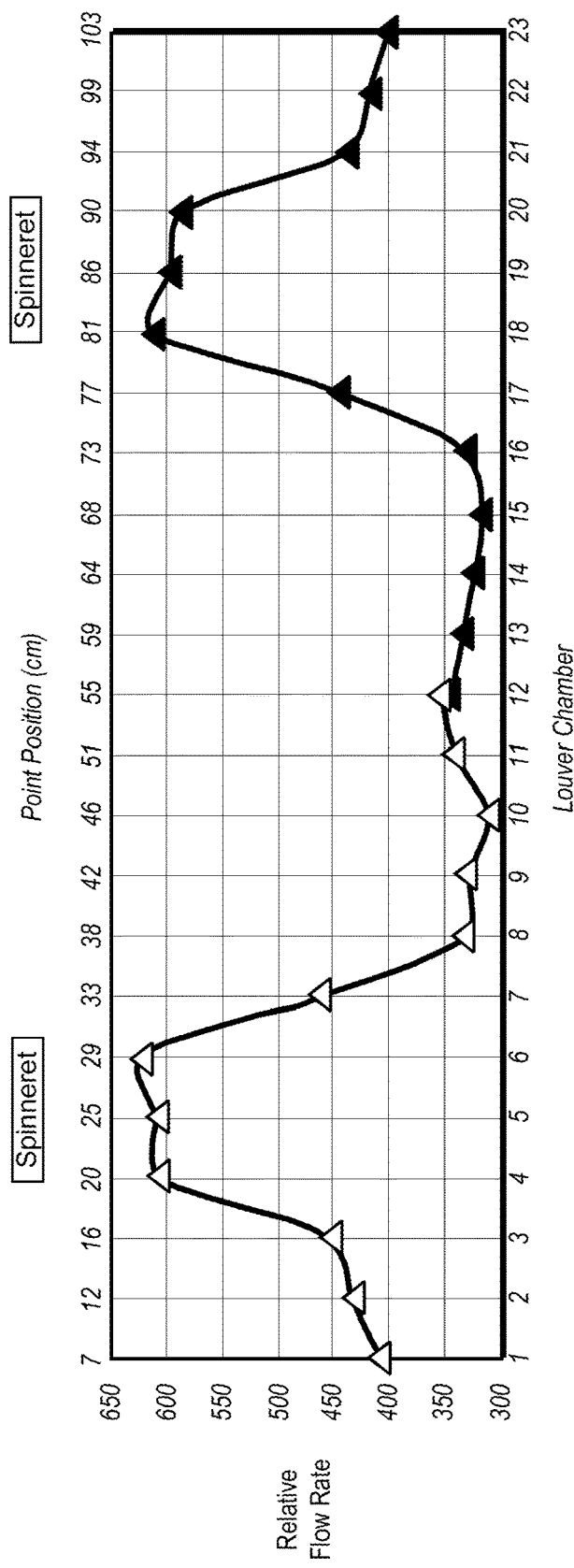
FIG. 9 depicts an exemplary airflow distribution used to create a more even fiber deposition pattern on a substrate using two spinnerets to generate fibers.
Figure 10:
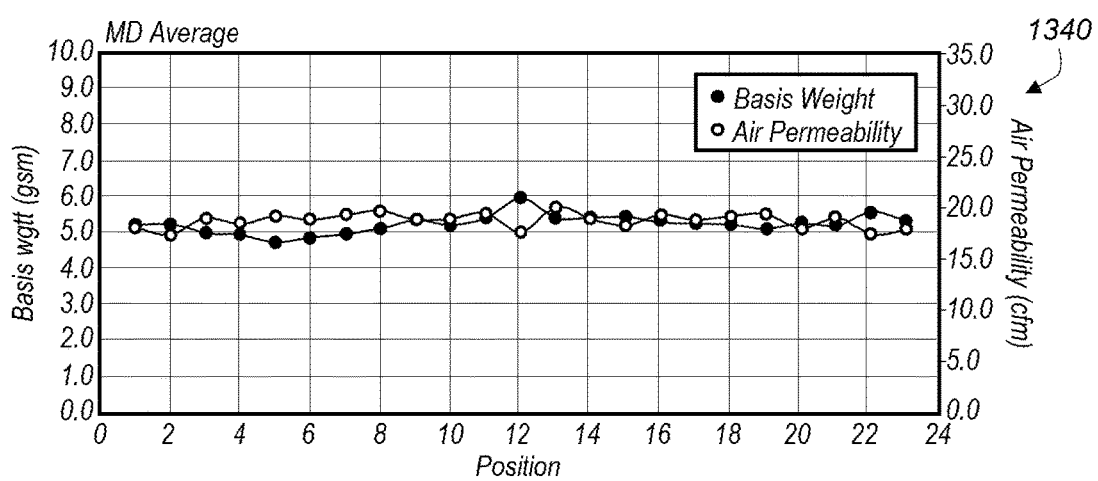
FIG. 10 depicts results from a fiber deposition using the airflow distribution of FIG. 9.

FIG. 9 depicts a schematic diagram of an exemplary louver configuration to compensate for the circular or doughnut shaped distribution typical of prior art deposition systems. In this embodiment, the substrate support was divided into 23 rows of louvers, with each row of louvers being substantially isolated from the other rows of louvers (bottom horizontal axis). The top horizontal axis depicts the position of the louvers with respect to a one meter substrate. The relative flow rate of air through the substrate is indicated in the vertical axis. Each of the rows of louvers is independently adjusted to provide the indicated relative air flow through the substrate. The pattern of air flow is opposite to the deposition pattern of a typical two spinneret deposition system (See FIG. 4) with the highest air flow rates under the spinneret and the lowest air flow rates where the deposition is typically highest. FIG. 10 depicts a plot of the basis weight and air permeability of a substrate after deposition using the air flow pattern depicted in FIG. 9. As can be seen in FIG. 10, the fiber deposition is substantially even across the width of the substrate.

Previous patents have disclosed the use of electric fields to attract the fibers to the substrate. Electric fields of sufficient magnitude have produced fiber webs with enhanced performance characteristics. The electric field can also be used to tailor the distribution of the fibers as they deposit. Specifically, areas of higher field gradient will attract fibers more strongly than areas with lower field. In some embodiment, adjusting the gradient of the electric field over the surface of the substrate will aid in forming uniform fiber webs.

Figure 11:
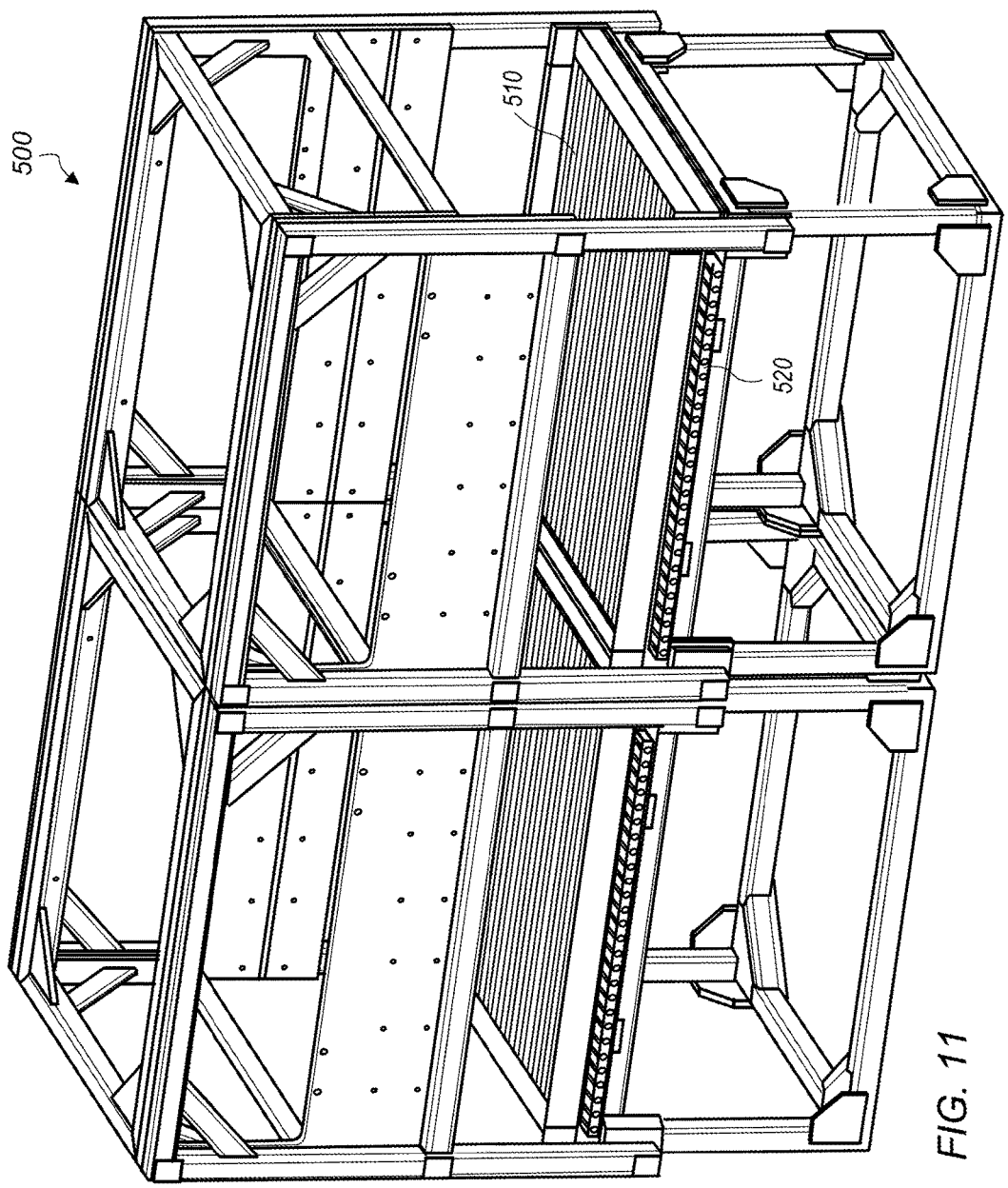
FIG. 11 depicts an embodiment of a fiber deposition system that includes a static plate controlled deposition system.

FIG. 11 depicts a deposition system 500 that directs fibers produced by a fiber producing device (not shown) toward a substrate disposed below the fiber producing device during use. The deposition system comprises a plurality of static plates 510 that are positionable under the substrate. An electric field control system 520 is coupled to the plurality of static plates. The electric field control system independently alters the electric field of each of the coupled static plates such that the electrostatic plates have an opposite charge to a charge of the fibers produced by the fiber producing device. The produced fibers are drawn toward the substrate due to an electrostatic attraction to the electrostatic plate. By providing the ability to independently alter the electric field of each plate, the attraction of fibers toward the substrate may by controlled to overcome the inherent uneven distribution of the fibers.

Figure 12:
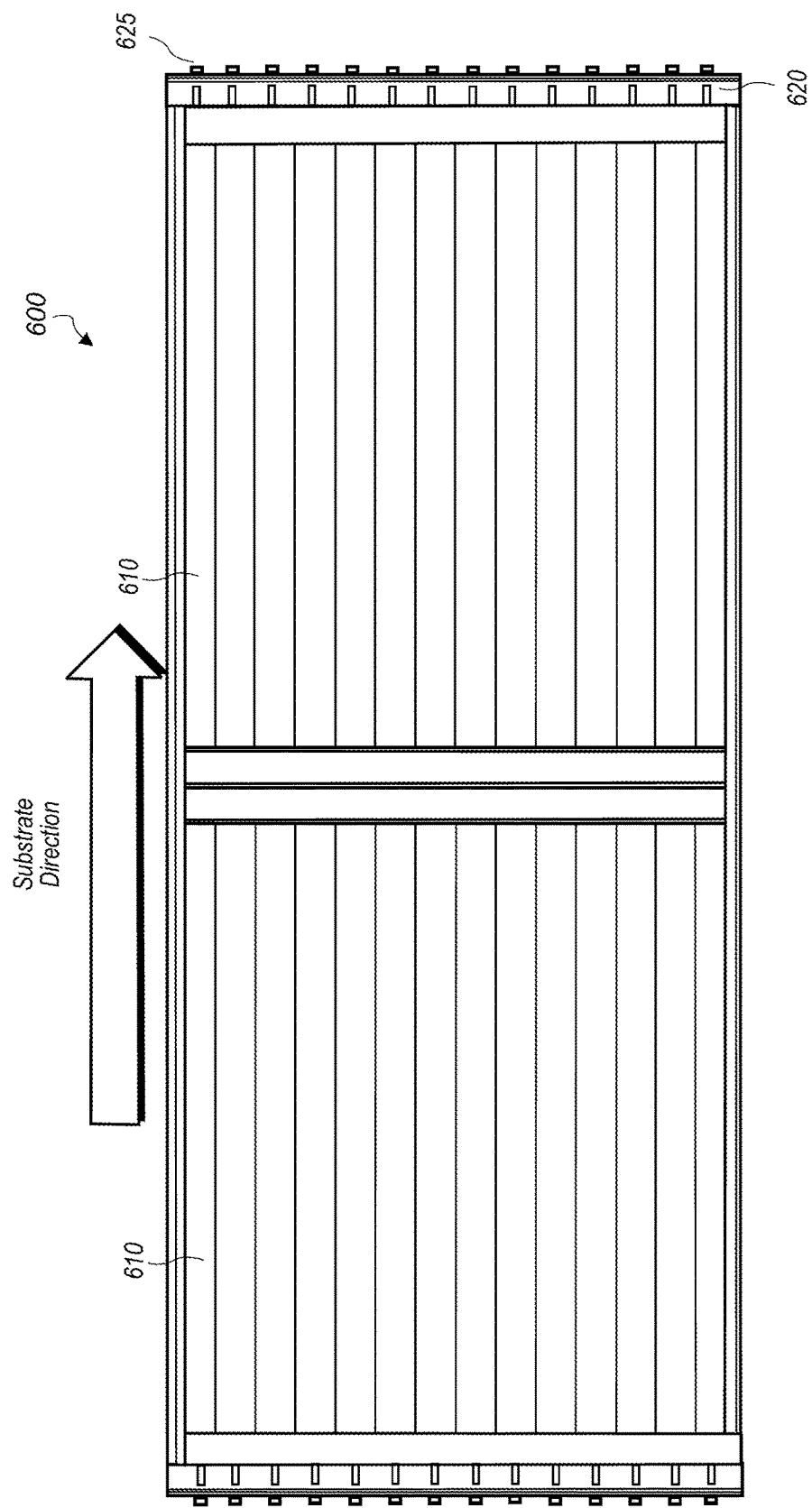
FIG. 12 depicts a substrate support having a plurality of static plates.

In an embodiment depicted in FIG. 12, the gradient of the electric field of each static plate, of a plurality of static plates is modified by imposing different voltages on different plates. For example, FIG. 12 depicts a substrate support 600 which is composed of a plurality of electrically isolated static plates 610. The voltages across each of the static plates can be individually adjusted to produce a substrate with uniform fiber deposition across the width. A plurality of variable voltage sources 625 are coupled to each individual static plate. Variable voltage sources 625 are incorporated into an electric field control system 620. Electric field control system uses variable voltage sources 625 to independently alter the electric field of each of static plates 610. Since there is little to no current required to maintain the voltage on each strip, low-power, high voltage power supplies can provide the required bias voltages and are incorporated into the electric field control system. Isolation between regions is set to take into account creepage induced by the largest voltage difference allowed between regions. Well known techniques for creepage mitigation can be applied.

Figure 13A:
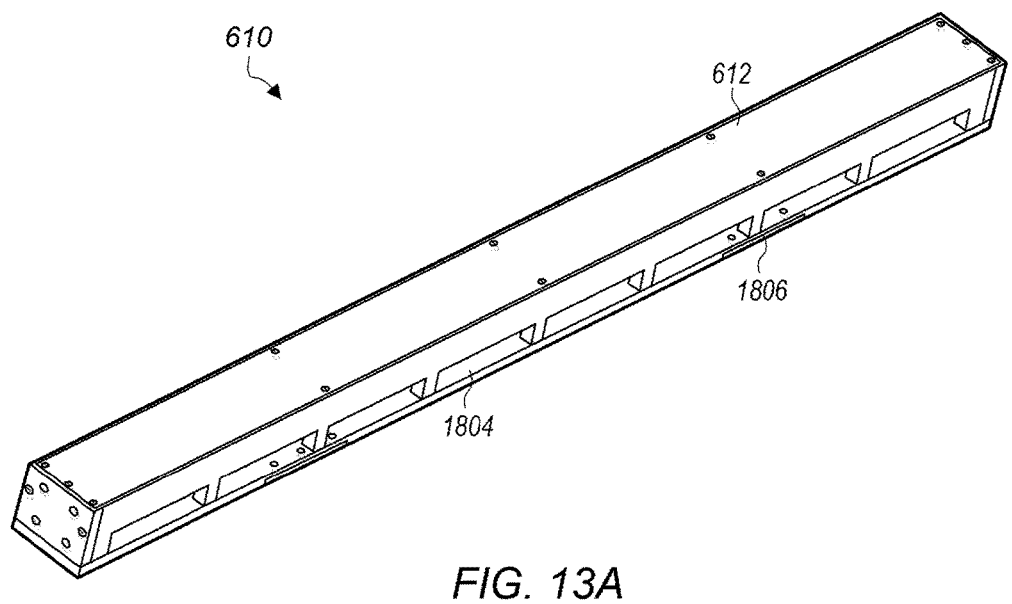
FIGS. 13A and 13B depicts exemplary static plates.
Figure 13B:
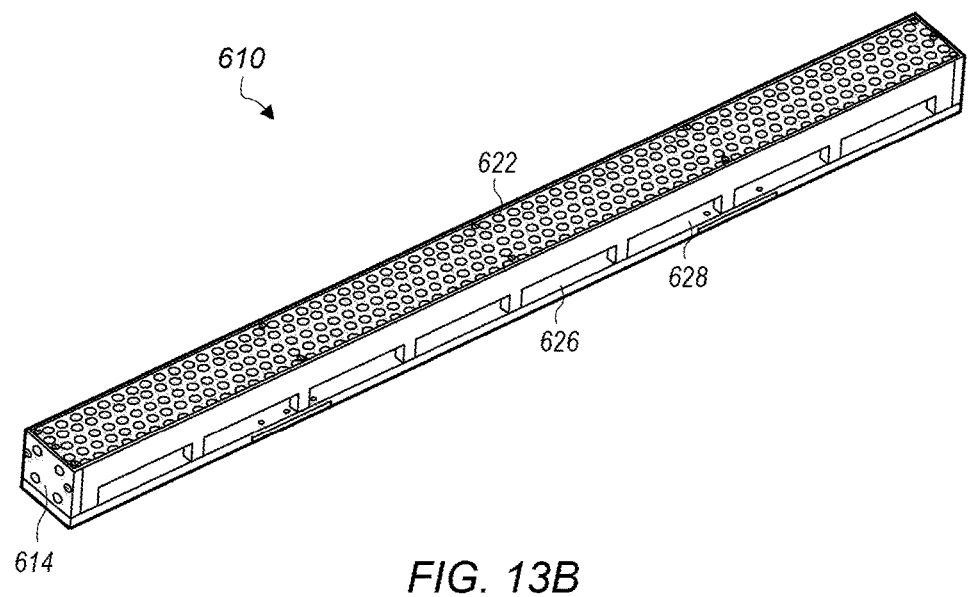

FIG. 13 depicts two embodiments of static plates 610. In FIG. 13A, a static plate 610 includes an upper plate surface 612 coupled to a body 614. An electrical connection 614 allows a voltage to be applied across the plate to create an electric field that draws fibers toward a substrate disposed above the plate. In FIG. 13B, static plate 610 includes a perforated upper surface 622. Perforated upper surface 622 allows air to flow through static plate 610 through the hollow portion 626 of the static plate. An electrical connection 614, allows a voltage to be applied across the plate to create an electric field that draws fibers toward a substrate disposed above the plate. In this manner, both air and an electric field can be used to alter the fiber distribution on the substrate. Optionally, static plate 610 may include one or more louver chambers 628, which include a louver as described above (not shown). Louvers can be used in the manner previously described to modify the airflow through the static plate.

Figure 14:
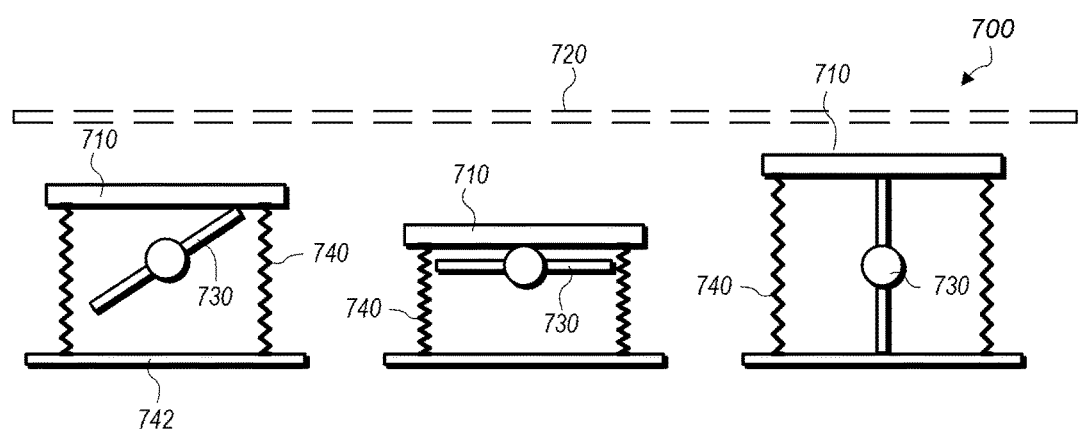
FIG. 14 depicts an elevator mechanism for altering the distance of static plates to a substrate support.

In an alternate embodiment, the gradient of the electric field is altered by changing the distance from the fiber producing device to an element of the static plate. FIG. 14 depicts a static plate system 700 having variable height static plates 710. For example, in an embodiment depicted in FIG. 14, a plurality of static plates 710 are positioned under the substrate, with each of the static plates having the same voltage. A non-conducting, perforated sheet 720 is positioned between the substrate and the static plates 710 to support the substrate and not modify the electric field gradient while allowing air to pass. Each strip is fixed to an elevator mechanism 730 that allows positioning the static plates 710 nearer or farther from the substrate. In an exemplary embodiment, elevator mechanism 730 is a rotatable plate (similar to the previously described louvers) which alters the position of the static plate 710 as plate is rotated. One or more springs 740 may be coupled between a base 742 of the static plate system and static plate 710. Springs 740 may be biased to pull static plate 710 toward base 742. During use, elevator mechanism 730 can be operated (e.g., the rotatable plate is rotated) to alter the distance of static plate 710 from the substrate support 720. As depicted in FIG. 14, static plate 710 can be positioned between an upper position (e.g., close to substrate support 720), a low position (e.g., at its maximum distance allowable by the configuration from the substrate support), or any position in between. The farther the strip is from the substrate, the farther it is from the fibers produced by the fiber producing device and thus a lower the field gradient is produced in the vicinity of the substrate. Fibers will be less strongly attracted to the lower electric field regions on the substrate, giving a lighter basis weight in these regions. In this way, the individual strips can be set to counteract the natural laydown pattern from a fiber producing device and provide a more uniform result.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of producing microfibers and/or nanofibers, comprising:
    placing material into a fiber producing device, the fiber producing device comprising a body comprising one or more openings and a coupling member, wherein the body is configured to receive material to be produced into a fiber;
    rotating the fiber producing device at a speed of at least about 1000 rpm, wherein rotation of the fiber producing device causes material in the body to be ejected through one or more openings to produce microfibers and/or nanofibers;
    directing fibers produced by the fiber producing device toward a substrate disposed below the fiber producing device using a deposition system, wherein the deposition system comprises:
    an airflow system that draws air through the substrate such that fibers produced by the fiber producing device are drawn toward the substrate;
    an airflow control system configured to adjust an airflow rate through one or more regions of the substrate;
    a static plate positioned below the substrate and including a louver chamber, wherein the louver chamber houses a louver that controls the air flow rate through the one or more regions of substrate.

2. The method of claim 1, wherein the step of rotating the fiber producing device includes rotating the body with a driver, wherein the body is coupled to the driver through the coupling member.

3. The method of claim 2, wherein the deposition system further comprises a substrate support, and wherein the airflow system is incorporated into the substrate support.

4. The method of claim 3, wherein the airflow control system comprises a plurality of adjustable louvers incorporated into the substrate support.

5. The method of claim 4, wherein each of the plurality of adjustable louvers is arranged in a louver chamber which is substantially isolated from the other louver chambers.

6. The method of claim 4, further comprising individually controlling each of the plurality of adjustable louvers with a plurality of control devices coupled to the adjustable louvers.

7. The method of claim 4, further comprising individually positioning the plurality of adjustable louvers in at least a fully open, a partially open, or a fully closed position.

8. The method of claim 2, further comprising moving a continuous sheet of the substrate through the deposition system with a substrate transfer system.

9. The method of claim 2, further comprising heating the material to be produced into a fiber with a heating device thermally coupled to the fiber producing device.

10. The method of claim 2, further comprising enclosing the fiber producing device in a chamber and controlling the environment inside the chamber.

11. The method of claim 1, wherein the substrate is a substantially continuous sheet, and wherein the method further comprises moving the substrate below the fiber producing device while fibers are being produced by the fiber producing device.

12. The method of claim 1, wherein the fibers are formed without subjecting the material to an externally-applied electric field that is sufficient to draw a fiber from the openings of the fiber producing device.

13. The method of claim 1, further comprising:
heating the material to a temperature sufficient to at least partially melt the material;
heating the fiber producing device to a temperature at or near the temperature sufficient to at least partially melt the material; and
placing the heated material in the heated fiber producing device.

14. The method of claim 1, further comprising:
placing material in the fiber producing device; and heating the fiber producing device to a temperature at or near the temperature sufficient to at least partially melt the material disposed in the fiber producing device.

15. The method of claim 1, further comprising mixing the material with a solvent to produce a mixture of the material in a solvent, and placing the mixture in the fiber producing device.

16. The method of claim 1, wherein the deposition system further comprises a substrate support, and wherein the airflow system is incorporated into the substrate support.

17. The method of claim 16, wherein the airflow control system comprises a plurality of adjustable louvers incorporated into the substrate support.

18. The method of claim 17, wherein each of the plurality of adjustable louvers is arranged in a louver chamber which is substantially isolated from the other louver chambers.

19. The method of claim 17, wherein each of the plurality of adjustable louvers is individually controlled by a plurality of control devices coupled to the adjustable louvers.

20. The method of claim 17, wherein each of the plurality of adjustable louvers is individually positionable in at least a fully open, a partially open, or a fully closed position.

21. The method of claim 1, wherein the deposition system further comprises a substrate transfer system, wherein the substrate transfer system moves a continuous sheet of substrate material through the deposition system.

22. The method of claim 1, wherein the deposition system further comprises a gas producing device configured to produce a gas flow that directs fibers formed by the fiber producing device toward the substrate.

23. The method of claim 1, further comprising heating the fiber producing device while the fiber producing device is producing fibers using a heating device thermally coupled to the fiber producing device.

24. The method of producing microfibers and/or nanofibers of claim 1, further comprising an electric field control system coupled to the static plate, wherein the electric field control system alters the charge of the static plate, such that the charge of the static plate is opposite that of the fibers produced by the fiber producing device.

25. The method of producing microfibers and/or nanofibers of claim 1, wherein a non-conducting perforated sheet is positioned between the substrate and the static plates to support the substrate and allow air to pass.

26. The method of producing microfibers and/or nanofibers of claim 1, further comprising:
an elevator system that allows positioning the static plate nearer or farther from the substrate.

27. The method of producing microfibers and/or nanofibers of claim 26, wherein the elevator mechanism is rotatable, such that the position of the static plate is altered when the elevator mechanism is rotated.

* * * * *